(12) United States Patent
Foo et al.

(10) Patent No.: US 12,744,664 B2
(45) Date of Patent: Sep. 22, 2026

(54) UNIVERSAL QUANTUM SECURE DEVICE, METHOD OF SENDING DATA AND METHOD OF RECEIVING DATA

(71) Applicant: MATRICTIME DIGITAL TECHNOLOGY CO., LTD, Nanjing (CN)

(72) Inventors: Boohea Foo, Nanjing (CN); Dahai Dai, Nanjing (CN); Ge Yang, Nanjing (CN); Chengyang Zhao, Nanjing (CN); Xiaoman Fu, Nanjing (CN)

(73) Assignee: MATRICTIME DIGITAL TECHNOLOGY CO., LTD, Nanjing (CN)

( * ) Notice: Subject to any disclaimer, the term of this patent is extended or adjusted under 35 U.S.C. 154(b) by 0 days.

(21) Appl. No.: 18/715,965

(22) PCT Filed: Jul. 28, 2023

(86) PCT No.: PCT/CN2023/109923
§ 371 (c)(1),
(2) Date: Jun. 3, 2024

(87) PCT Pub. No.: WO2024/027602
PCT Pub. Date: Feb. 8, 2024

(65) Prior Publication Data

US 2025/0038968 A1 Jan. 30, 2025

(30) Foreign Application Priority Data

Aug. 2, 2022 (CN) ......................... 202210925949.7
Aug. 15, 2022 (CN) ......................... 202210972522.2
Nov. 24, 2022 (CN) ......................... 202211481281.8

(51) Int. Cl.
*H04L 29/06* (2006.01)
*H04L 9/08* (2006.01)
*H04L 9/40* (2022.01)

(52) U.S. Cl.
CPC ........ *H04L 9/0852* (2013.01); *H04L 63/0428* (2013.01)

(58) Field of Classification Search
CPC .......................... H04L 9/0852; H04L 63/0428
See application file for complete search history.

(56) References Cited

U.S. PATENT DOCUMENTS

2005/0157875 A1* 7/2005 Nishioka ............... H04L 9/0858 380/46
2011/0142242 A1* 6/2011 Tanaka .................. H04L 9/0852 380/282

(Continued)

FOREIGN PATENT DOCUMENTS

CN 201966951 U 9/2011
CN 103634274 A 3/2014

(Continued)

OTHER PUBLICATIONS

International Search Report and Written Opinion for International Application No. PCT/CN2023/109923 mailed Nov. 10, 2023.

(Continued)

*Primary Examiner* — Dao Q Ho
(74) *Attorney, Agent, or Firm* — Ballard Spahr LLP

(57) ABSTRACT

The present application provides a universal quantum secure device and methods of sending and receiving data. A quantum encryption and decryption module can realize quantum encryption and decryption of data requiring quantum encryption service, thereby ensuring that data sent and received by the universal quantum secure device from a conventional network are transmitted in ciphertext form. An isolation module can realize isolation between the commu- (Continued)

nication module and each of the quantum encryption and decryption module and a privacy module, so that security of the privacy module and security of the quantum encryption and decryption module are protected from being affected by data received by the communication module from external network. Since the privacy module does not communicate with external network, and encryption and decryption of the data can only be carried out in the quantum encryption and decryption module of the universal quantum secure device, improving data security.

19 Claims, 4 Drawing Sheets

(56) References Cited

U.S. PATENT DOCUMENTS

| | | | | |
|---|---|---|---|---|
| 2016/0127127 | A1* | 5/2016 | Zhao | H04W 12/041 713/171 |
| 2018/0309572 | A1* | 10/2018 | Kurian | H04L 9/12 |
| 2020/0106606 | A1* | 4/2020 | Pontaza Rodas | H04L 9/3093 |
| 2020/0250347 | A1* | 8/2020 | Han | G06F 11/1451 |
| 2020/0351086 | A1* | 11/2020 | Walenta | H04L 9/083 |
| 2022/0345300 | A1* | 10/2022 | Inamdar | H04L 63/0869 |
| 2023/0275747 | A1* | 8/2023 | Gao | H04L 9/0855 380/281 |
| 2025/0038968 | A1* | 1/2025 | Foo | H04L 9/40 |
| 2025/0202688 | A1* | 6/2025 | Xie | H04L 9/0852 |

FOREIGN PATENT DOCUMENTS

| | | | |
|---|---|---|---|
| CN | 204392484 | U | 6/2015 |
| CN | 105491011 | A | 4/2016 |
| CN | 105871902 | A | 8/2016 |
| CN | 108075883 | A | 5/2018 |
| CN | 108881313 | A | 11/2018 |
| CN | 208174696 | U | 11/2018 |
| CN | 109194477 | A | 1/2019 |
| CN | 210578650 | U | 5/2020 |
| CN | 112073375 | A | 12/2020 |
| CN | 113824124 | A | 12/2021 |
| CN | 114338019 | A | 4/2022 |
| CN | 114362944 | A | 4/2022 |
| CN | 114978784 | A | 8/2022 |
| CN | 115001686 | A | 9/2022 |
| CN | 115051857 | A | 9/2022 |
| CN | 115348081 | A | 11/2022 |
| CN | 115834210 | A | 3/2023 |
| KR | 20170081537 | A | 7/2017 |

OTHER PUBLICATIONS

Office Action for Chinese Application No. 202210972522.2 mailed Jun. 5, 2024.

Office Action for Chinese Application No. 202210972522.2 mailed Nov. 21, 2024.

Office Action for Chinese Application No. 202211481281.8 mailed Apr. 21, 2026.

* cited by examiner

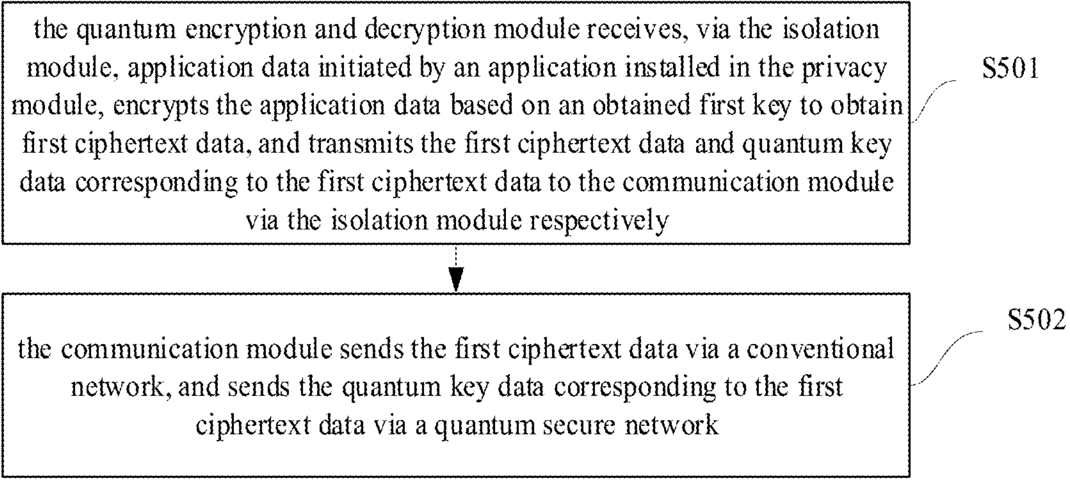

FIG. 5 the quantum encryption and decryption module receives, via the isolation module, data received by the communication module from an external network, where the data includes an encrypted message or quantum key data, the encrypted message includes second ciphertext data, and the quantum key data includes a second key; in response to receiving the encrypted message, determines quantum key data that matches the encrypted message, obtains a second key based on the matched quantum key data, and decrypts the second ciphertext data included in the encrypted message based on the second key to obtain decrypted application data; and sends the decrypted application data to the isolation module

S601 the isolation module sends the decrypted application data to an application installed in the privacy module

UNIVERSAL QUANTUM SECURE DEVICE, METHOD OF SENDING DATA AND METHOD OF RECEIVING DATA

CROSS REFERENCE TO RELATED APPLICATIONS

This application is a U.S. national stage of PCT/CN2023/109923, filed on Jul. 28, 2023, which claims priority to Chinese Patent Application No. 202210925949.7, filed on Aug. 2, 2022, entitled as "UNIVERSAL QUANTUM SECURE DEVICE AND SYSTEM", the entire content of which is incorporated herein by reference in its entirety. This application claims priority to Chinese Patent Application No. 202210972522.2, filed on Aug. 15, 2022, entitled "SECURE TRANSMISSION VERIFICATION METHOD, DEVICE, SYSTEM, APPARATUS AND MEDIUM", the entire content of which is incorporated herein by reference in its entirety. This application claims priority to Chinese Patent Application No. 202211481281.8, filed on Nov. 24, 2022, entitled as "METHOD OF SENDING DATA IN QUANTUM SECURE NETWORK, METHOD OF RECEIVING DATA IN QUANTUM SECURE NETWORK, AND COMMUNICATION SYSTEM", the entire content of which is incorporated herein by reference in its entirety.

TECHNICAL FIELD

The present application relates to the field of information security and quantum cryptography, and in particular, relates to a universal quantum secure device, a method of sending data, and a method of receiving data.

BACKGROUND

With the popularization of Internet applications, the life of the public has become more convenient in recent years, but the resulting data leakage incidents have also been widely concerned. Nowadays, data security has become one of the most important research topics in computer and network disciplines, and plays a crucial role in personal privacy, business privacy and other aspects of enterprises.

The security of information itself depends largely on the security of information in the process of generation, transmission and use, i.e., the security of information in the universal information domain (for the sake of convenience of description, recorded as universal). How to strictly protect the information in the universal domain from being stolen and tampered with so that the information is in an comprehensive protection environment is a problem that has been increasingly concerned about by people in recent years.

In the related technology, electronic devices can find abnormal data and filter it through firewall software or antivirus software, i.e., protecting information security in way of software protection. For this way, there are the following problems:

1. Only known risks can be detected. This type of software relies heavily on known risk features, and protection cannot be achieved with unknown features or no features at all.

2. Only passive defense rather than active defense can be taken. The software can detect the risk only when the data has been attacked, and can not avoid attacks in advance.

3. Privacy cannot be protected. This type of software requires access to user data and needs to read the content of the data in order to identify whether the data has already been attacked or not.

It can be seen that the above way to protect information security cannot guarantee the security of data transmission, and there is still a great risk of vulnerability in the protection of information.

SUMMARY

The present application provides a universal quantum secure device, a method of sending data and a method of receiving data, which achieve more comprehensive protection for data security.

In a first aspect, the present application provides a universal quantum secure device. The universal quantum secure device includes an isolation module, a quantum encryption and decryption module, a communication module, and a privacy module, the isolation module being connected to each of the quantum encryption and decryption module, the communication module and the privacy module;

the privacy module is configured to install an application and process application data of the application;

the isolation module is configured to transmit data between modules in the universal quantum secure device which are connected to the isolation module, the data including application data, ciphertext data, and quantum key data corresponding to the ciphertext data;

the quantum encryption and decryption module is configured to perform quantum encryption and decryption on data which is transmitted by the isolation module and requires quantum encryption service; and the communication module is configured to send and receive the ciphertext data over a conventional network, and send and receive the quantum key data corresponding to the ciphertext data over a quantum secure network.

In a second aspect, the present application further provides a method of sending data, which is applied to the above-mentioned universal quantum secure device and includes:

receiving, by the quantum encryption and decryption module via the isolation module, application data initiated by an application installed in the privacy module; encrypting, by the quantum encryption and decryption module, the application data based on an obtained first key to obtain first ciphertext data; and transmitting, by the quantum encryption and decryption module, the first ciphertext data and quantum key data corresponding to the first ciphertext data to the communication module via the isolation module respectively; and sending, by the communication module, the first ciphertext data over a conventional network, and sending, by the communication module, the quantum key data corresponding to the first ciphertext data over a quantum secure network.

In a third aspect, the present application further provides a method of receiving data, which is applied to the above-mentioned universal quantum secure device and includes:

receiving, by the quantum encryption and decryption module via the isolation module, data received by the communication module from an external network, where the data includes an encrypted message or quantum key data, the encrypted message includes second ciphertext data, and the quantum key data includes a second key; for the received encrypted message, determining quantum key data that matches the encrypted message, obtaining a second key based on the matched quantum key data, and decrypting the second ciphertext data comprised in the encrypted message based on the second key to obtain decrypted application data; and sending the decrypted application data to the isolation module; and sending, by the isolation module, the decrypted application data to an application installed in the privacy module.

BRIEF DESCRIPTION OF THE DRAWINGS

In order to more clearly illustrate technical solutions in the embodiments of the present application or in the conventional technology, the accompanying drawings to be used in the description of the embodiments or the conventional technology will be briefly introduced below, and it will be obvious that the accompanying drawings in the following description are only for embodiments of the present application, and that other accompanying drawings can be obtained according to the disclosed accompanying drawings for the person of ordinary skill in the field without putting forth any creative labor.

FIG. 5 shows a schematic flow chart of the method of sending data according to an embodiment of the present application; and FIG. 6 shows a schematic flow chart of the method of receiving data according to an embodiment of the present application.

DETAILED DESCRIPTION OF THE EMBODIMENTS

Technical solutions according to embodiments of the present application are described clearly and completely in the following in conjunction with the accompanying drawings in the embodiments of the present application. It is obvious that the described embodiments are only a part of rather than all of the embodiments of the present application. Based on the embodiments described in the present application, all other embodiments obtained by a person of ordinary skill in the art without making creative efforts fall within the scope of protection of the present application.

In view of the above problems, a universal quantum secure device, a method of sending data and a method of receiving data are provided according to embodiments of the present application.

Figures 1, 2:
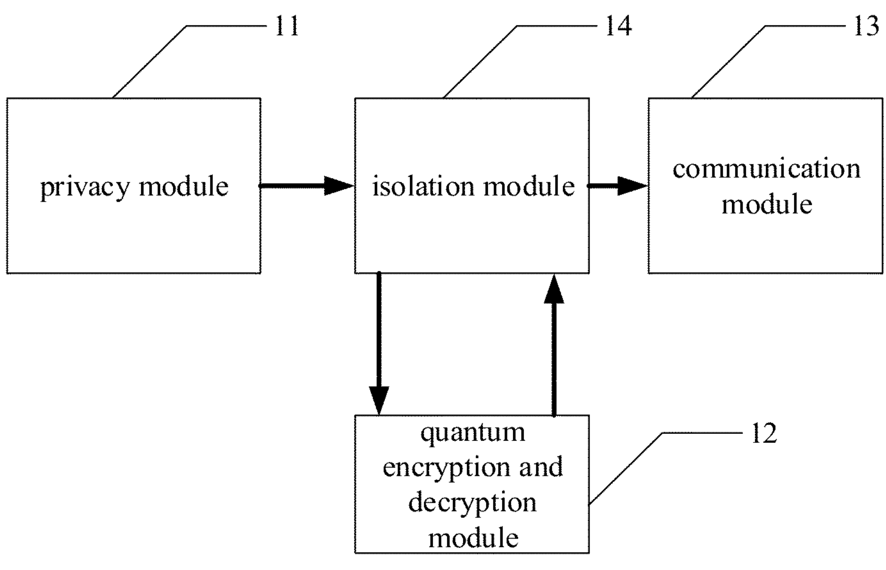
FIG. 1 shows a schematic structure of a universal quantum secure device provided by an embodiment of the present application.
FIG. 2 shows a schematic diagram of a structure of a power control module provided by an embodiment of the present application.

FIG. 1 shows a schematic structure of a universal quantum secure device provided by an embodiment of the present application. The universal quantum secure device includes: an isolation module 14, a quantum encryption and decryption module 12, a communication module 13, and a privacy module 11. The isolation module 14 is connected to each of the quantum encryption and decryption module 12, the communication module 13 and the privacy module 11.

The privacy module 11 is used for installing an application and processing application data of the application.

The isolation module 14 is used for transmitting data between modules in the universal quantum secure device which are connected to the isolation module 14. The data includes application data, ciphertext data and quantum key data corresponding to the ciphertext data.

The quantum encryption and decryption module 12 is used for performing quantum encryption and decryption on data which is transmitted by the isolation module 14 and requires quantum encryption service.

The communication module 13 is used for sending and receiving the ciphertext data over a conventional network, and sending and receiving the quantum key data corresponding to the ciphertext data over a quantum secure network.

In the present application, the universal quantum secure device may include the privacy module 11, the isolation module 14, the quantum encryption and decryption module 12, and the communication module 13. The privacy module 11, the quantum encryption and decryption module 12 and the communication module 13 are mutually unconnected. The privacy module 11, the quantum encryption and decryption module 12 and the communication module 13 are each connected to the isolation module 14. The universal quantum secure device may be a quantum secure terminal such as a quantum secure all-in-one machine, a quantum secure computer or a quantum secure mobile terminal; or may be a quantum secure system which may include multiple quantum secure terminals, and functions realized by the various modules in the universal quantum secure device may be realized through the multiple quantum secure terminals.

Hereinafter follows a description of each of the modules included in the universal quantum secure device.

I. Privacy Module 11

In the universal quantum secure device, the privacy module 11 cannot communicate directly with an external network. The privacy module 11 is used for installing an application as well as processing application data of the application. For example, the privacy module 11 may initiate application data, store application data, etc. Based on a security level of a particular application, the user may determine whether to install the application into the privacy module 11 to ensure that the security of the application data of the application cannot be directly affected by the external network. For instance, if a certain application has high requirement on security, indicating that the security of the application data of the application may affect the privacy security as well as the property security of the user, then the application may be installed into the privacy module 11; if a certain application does not have high requirement on security, i.e., the application data of the application does not affect the privacy security as well as the property security of the user, then the application may be installed into the communication module 13 of the universal quantum secure device. Of course, the user may install all legitimate applications into the privacy module 11. When an application installed in the privacy module 11 communicates with the external network, communication with the external network is performed by means of a quantum secure communication technology, i.e., data sent by the privacy module 11 is transmitted to the external network in the form of ciphertext after quantum encryption, and data obtained by the privacy module 11 from the external network is also transmitted in the form of ciphertext across the network.

II. Quantum Encryption and Decryption Module 12

In the present application, the universal quantum secure device further includes the quantum encryption and decryption module 12 that is incapable of communicating directly with an external network. The quantum encryption and decryption module 12 is adapted to quantum encrypt and decrypt data transmitted by the isolation module 14 that requires quantum encryption and decryption services. That is, the quantum encryption and decryption module 12 encrypts data transmitted by the isolation module 14 that requires quantum encryption service, and decrypts data transmitted by the isolation module 14 that requires quantum decryption service. The quantum encryption and decryption module 12 is also adapted to store quantum security data such as a key, while the privacy module 11 does not have the capability of quantum encryption and decryption, and quantum security data such as a key is not stored in the privacy module 11, thereby separating the quantum security data from the application data of the application, safeguarding the security of the quantum security data, and improving the security of the application data in the privacy module 11.

Exemplarily, after obtaining data transmitted by the isolation module 14 that requires quantum encryption service, the quantum encryption and decryption module 12 of the universal quantum secure device may obtain a key (noted as a first key) of the universal quantum secure device, and then encrypt, based on the first key, the data that requires quantum encryption service. For example, after the quantum encryption and decryption module 12 of the universal quantum secure device obtains the application data transmitted by the privacy module 11 via the isolation module 14, the quantum encryption and decryption module 12 obtains a first key from a key pool of the universal quantum secure device, and encrypts the application data based on this first key to obtain ciphertext data (noted as first ciphertext data).

Further exemplarily, after obtaining data transmitted by the isolation module 14 that requires a quantum decryption service, the quantum encryption and decryption module 12 of the universal quantum secure device may decrypt the data that requires quantum decryption service based on a key (denoted as a second key) corresponding to the data that requires quantum decryption service, and obtain decrypted application data. For example, after the quantum encryption and decryption module 12 of the universal quantum secure device obtaining ciphertext data transmitted by the isolation module 14 (noted as second ciphertext data), the quantum encryption and decryption module 12 may obtain quantum key data corresponding to the second ciphertext data transmitted by the isolation module 14, obtain a second key based on the quantum key data, decrypt the second ciphertext data based on the second key to obtain decrypted application data, and then transmit the decrypted application data to the privacy module 11.

III. Communication Module 13

The universal quantum secure device further includes the communication module 13 which is in direct communication with an external network. The communication module 13 is adapted to send and receive ciphertext data through a conventional network and send and receive a key corresponding to the ciphertext data through a quantum secure network. For instance, after the quantum encryption and decryption module 12 of the universal quantum secure device encrypting the data requiring quantum encryption service, the quantum encryption and decryption module 12 may obtain first ciphertext data and quantum key data corresponding to the first ciphertext data, and transmit the first ciphertext data and the quantum key data corresponding to the first ciphertext data to the communication module 13 through the isolation module 14; the communication module 13 may transmit the first ciphertext data to a peer device through a conventional network, and may relay the quantum key data corresponding to the first ciphertext data to the peer device via a quantum secure network. For another instance, the communication module 13 may receive second ciphertext data sent by the peer device through the conventional network and may receive quantum key data corresponding to the second ciphertext data relayed by the peer device through the quantum secure network, and the communication module 13 may send the second ciphertext data and the quantum key data corresponding to the second ciphertext data separately to the quantum encryption and decryption module 12 through the isolation module 14, so that the quantum encryption and decryption module 12 may decrypt the second ciphertext data based on the quantum key data corresponding to the second ciphertext data to obtain decrypted application data.

IV. Isolation Module 14

In order to further ensure the security of the privacy module 11 and the quantum encryption and decryption module 12, in the present application, the universal quantum secure device further includes the isolation module 14, which is adapted to transmit data between modules in the universal quantum secure device that are connected to the isolation module 14, for example, transmission of application data between the privacy module 11 and the quantum encryption and decryption module 12, transmission of ciphertext data and quantum key data corresponding to the ciphertext data between the quantum encryption and decryption module 12 and the communication module 13, etc. In this way, when the modules in the universal quantum secure device that are connected to the isolation module 14 are isolated from each other, communication among the modules in the universal quantum secure device that are connected to the isolation module 14 may stilled be achieved. As the isolation module 14 may realize physical isolation between the privacy module 11 and the quantum encryption and decryption module 12, the application data is separated from the quantum security data in storage locations, which may avoid, to a certain extent, the application data from affecting the security of the quantum security data. Meanwhile, with the isolation module 14, the communication module 13 may be isolated from each of the privacy module 11 and the quantum encryption and decryption module 12, thereby avoiding the influence of data from external network on the security of the privacy module 11 and on the security of the quantum encryption and decryption module 12.

Exemplarily, hereinafter illustrates two scenarios where the universal quantum secure device sends data and receives data respectively.

In a first scenario, the universal quantum secure device functions as a transmitter.

If an application installed in the privacy module 11 of the transmitter requires quantum secure communication, the privacy module 11 may obtain application data initiated by the application and send the application data to the isolation module 14 of the transmitter.

In an example, the application data includes one or any combination of the following: transmitter port information, peer device port information, an IP address of the privacy module 11, a destination IP address, application layer data, and link layer information.

Exemplarily, when an application installed in the privacy module 11 initiating application data, the privacy module 11 may obtain port information of a port for monitoring service of the transmitter (denoted as transmitter port information), port information of a port for monitoring service of a peer device (denoted as peer device port information), the IP address of the privacy module 11, the destination IP address, the application layer data, and the link layer information.

The privacy module 11 may encapsulate the transmitter port information, the peer device port information, the IP address of the privacy module 11, the destination IP address, the application layer data and the link layer information to obtain the application data. For example, the transmitter is $P_1$ and the peer device is $P_2$. When $P_1$ accesses application data, the transmitter port information ($P_{client}$), the peer device port information ($P_{server}$), MAC addresses of ports of a data channel between the privacy module 11 and the isolation module 14 ($M_A$ and $M_B$), the IP address of the privacy module 11 ($IP_A$), the destination IP address ($IP_a$), and service data (Data) may be obtained. $P_{client}$, $P_{server}$, $IP_A$, $IP_a$ and Data are encapsulated in accordance with a standard protocol to obtain the application data.

In reception of the application data, the isolation module 14 may send the application data to the quantum encryption and decryption module 12 of the transmitter.

In a possible implementation, after receiving the application data, the isolation module 14 may reconstruct a link layer of the application data based on a data type of the application data. For example, if the data type of the application data is Ether type, the link layer of the application data is reconstructed based on a MAC address. The isolation module 14 then sends the application data to the quantum encryption and decryption module 12 so that the quantum encryption and decryption module 12 may encrypt the application data.

After the quantum encryption and decryption module 12 obtaining the application data sent by the isolation module 14, the quantum encryption and decryption module 12 may obtain a first key for encrypting the application data, and encrypt the application data using the first key to obtain first ciphertext data. For example, the application data is encrypted using the first key in a preset encryption manner. The quantum encryption and decryption module 12 may then transmit the first ciphertext data and quantum key data corresponding to the first ciphertext data, separately, to the isolation module 14. The isolation module 14 transmits the first ciphertext data and the quantum key data corresponding to the first ciphertext data, separately, to the communication module 13. The communication module 13 may transmit the first ciphertext data to the peer device through a conventional network, and relay the quantum key data corresponding to the first ciphertext data to the peer device through a quantum secure network.

In an example, considering that the first ciphertext data and the first key corresponding to the first ciphertext data need to be accurately sent to the peer device subsequently, in the present application, the transmitter needs to obtain a reachable IP address of a communication module of the peer device, in order to accurately send the first ciphertext data through a conventional network (e.g., a local area network, the Internet, etc.) to the communication module 13 of the peer device; in addition, the transmitter needs to obtain a network access identification of the peer device in order to accurately relay the first key through a quantum secure network to the peer device. In view of the above, the quantum encryption and decryption module 12 may, based on a destination IP address of the peer device, find the network access identification of the peer device and the reachable IP address of the communication module of the peer device, and thus independently transmit transmission data carrying the IP address of the communication module 13 of the peer device and the first ciphertext data (referred to as first transmission data), as well as quantum key data carrying the network access identification of the peer device and a key index of the first key to the communication module 13 via the isolation module 14.

In a possible implementation, the quantum encryption and decryption module 12 stores a correspondence among an IP address, the reachable IP address of the communication module of the peer device and the network access identification. The quantum encryption and decryption module 12 may obtain, based on the destination IP address of the peer device, the network access identification corresponding to the destination IP address and the IP address of the communication module 13 of the peer device corresponding to the destination IP address from the correspondence among the IP address, the reachable IP address of the communication module of the peer device and the network access identification.

In an example, since the destination IP address carried in application data may also be encrypted during a process of encrypting the application data, the communication module 13 may not be able to accurately send the ciphertext data to a receiver subsequently. In view of this, in the present application, the quantum encryption and decryption module 12 may extract the destination IP address carried in the application data before encrypting the application data, so as to facilitate the quantum encryption and decryption module 12 to determine the reachable IP of the receiver and the network access identification of the receiver based on the destination IP address.

In the present application, in a process of sending the quantum key data by the universal quantum secure device to the peer device through the quantum secure network, the universal quantum secure device first sends the quantum key data to a quantum secure base station accessed by the universal quantum secure device; after receiving the quantum key data, the quantum secure base station may obtain the first key based on the key index carried in the quantum key data, and then accurately relay the quantum key data to the peer device based on the network access identification carried in the quantum key data. In view of this, the universal quantum secure device also needs to obtain base station communication information of the quantum secure base station, in order to send the quantum key data to the quantum secure base station based on the base station communication information, such that the quantum key data is accurately relayed to the peer device by the quantum secure base station, thereby sending the quantum key data by the universal quantum secure device to the peer device through the quantum secure network.

In a possible implementation, the communication module 13 of the universal quantum secure device may store base station communication information of the quantum secure base station accessed by the universal quantum secure device, and in reception of the quantum key data transmitted by the isolation module 14, the communication module 13 may send the quantum key data to the quantum secure base station based on the stored base station communication information.

In another possible implementation, the quantum encryption and decryption module 12 of the universal quantum secure device also stores base station communication information of the quantum secure base station accessed by the universal quantum secure device, and in acquisition of the quantum key data, the quantum encryption and decryption module 12 may transmit, via the isolation module 14, transmission data that carries the quantum key data and the base station communication information (denoted as second transmission data) to the communication module 13. For example, the isolation module 14 may reconstruct a link layer of the transmission data (including the first transmission data and the second transmission data) based on a data type of the transmission data, and then transmit the transmission data to the communication module 13. The communication module 13 may transmit, according to the base station communication information carried in the second transmission data, the quantum key data carried in the second transmission data to the quantum secure base station.

Exemplarily, in acquisition of the transmission data, the transmission data being the first transmission data, the communication module 13 transmits the ciphertext data carried in the first transmission data to the receiver through a conventional network based on the reachable IP address of the communication module of the receiver carried in the first transmission data. In acquisition of the transmission data, the transmission data being the second transmission data, the communication module 13 transmits, through the quantum secure network based on the base station communication information carried in the second transmission data, the quantum key data to the quantum secure base station accessed by the transmitter; the quantum secure base station obtains a first key from a matched key pool for the transmitter based on the quantum key data, and then relays the quantum key data including the first key and the network access identification to the receiver.

In a second scenario, the universal quantum secure device functions as a receiver.

Alternatively, the universal quantum secure device may serve as a receiver which receives data. The data may be quantum key data sent by a peer device via a quantum secure network, or an encrypted message sent by the peer device via a conventional network. The encrypted message carries second ciphertext data and a source IP. The quantum key data carries a second key and a network access identification of a transmitter.

It should be noted that, considering that an IP of the encrypted message, transmitted via the conventional network, at a network layer of the conventional network may be swapped by a gateway, as a result, the source IP carried in the encrypted message may be a reachable IP of the transmitter or a reachable IP of the gateway.

In reception of the data, the communication module 13 transmits the received data to the isolation module 14 of the universal quantum secure device. For instance, the communication module 13 reconstructs a link layer of the data based on a data type of the data, and then sends the data to the isolation module 14.

In reception of the data sent by the communication module 13, the isolation module 14 transmits the data to the quantum encryption and decryption module 12 of the universal quantum secure device. For instance, in acquisition of the data sent by the communication module 13, the isolation module 14 reconstructs the link layer of the data based on the data type of the data, and then sends the data to the quantum encryption and decryption module 12.

The quantum encryption and decryption module 12 may receive data from an external network, which is transmitted by the communication module 13 via the isolation module 14. During processing performed by the quantum encryption and decryption module 12 on the data transmitted by the isolation module 14, if the data is data requiring quantum decryption service, the quantum encryption and decryption module 12 may obtain, from all cached quantum key data, quantum key data corresponding to the data requiring quantum decryption service. For example, according to pre-configured protocol specifications, the quantum encryption and decryption module 12 may obtain a key sequence from the data requiring quantum decryption service and obtain target quantum key data carrying the key sequence from all cached quantum key data. Then, the quantum encryption and decryption module 12 decrypts, based on the quantum key data, the second ciphertext data included in the data requiring quantum decryption service, thereby obtaining decrypted application data.

Exemplarily, in reception of an encrypted message, the quantum encryption and decryption module 12 may obtain a key sequence carried in a data header of the encrypted message and search for target quantum key data carrying the key sequence from all cached quantum key data, according to pre-configured protocol specifications. Then, the quantum encryption and decryption module 12 may obtain, based on the target quantum key data, a second key for decrypting second ciphertext data included in the encrypted message, and may decrypt the second ciphertext data included in the encrypted message according to the second key to obtain decrypted application data.

In a possible implementation, the second key carried in the quantum key data may be encrypted, the quantum key data further includes a key index of an encryption key that encrypts the second key, thereby ensuring the second key to be safely transmitted to the receiver. Exemplarily, the quantum encryption and decryption module 12 may obtain the encryption key from a pre-configured key pool with the key index carried in the quantum key data, and may decrypt the encrypted second key in the quantum key data based on the encryption key to obtain the second key.

In a possible embodiment, in order to facilitate subsequent communication with the peer device, the quantum encryption and decryption module 12, after obtaining the decrypted application data, may further obtain an IP address of the peer device (denoted as transmitter IP address) from the decrypted application data, and establish a correspondence among the transmitter IP address, the source IP carried in the encrypted message, and the network access identification carried in the quantum key data matching with the encrypted message. The source IP is an IP to which the communication module 13 is linked for receiving the encrypted message.

In acquisition of the decrypted application data, the quantum encryption and decryption module 12 may transmit the decrypted application data to the isolation module 14, thereby sending the decrypted application data to an application installed in the privacy module 11 via the isolation module 14. Exemplarily, in reception of the decrypted application data sent by the quantum encryption and decryption module 12, the isolation module 14 may reconstruct a link layer of the decrypted application data based on a data type of the decrypted application data, then send the decrypted application data to the application installed in the privacy module 11.

The beneficial effects of the universal quantum secure device of the embodiments of the present application are as follows.

1. With the isolation module 14, the privacy module 11 can be isolated from the quantum encryption and decryption module 12. Hence, the application data is separated from the quantum security data, which avoids, to a certain extent, the application data from affecting the security of the quantum security data.

2. The quantum encryption and decryption module 12 can realize quantum encryption and decryption of data requiring quantum encryption service. Hence, data transmitted and received by the universal quantum secure device via the conventional network are ensured to be transmitted in form of ciphertext, ensuring safe transmission of the data across the conventional network and realizing active defense to a certain extent.

3. The communication module 13 is a module of the universal quantum secure device, which can communicate with an external network. With the isolation module 14, the communication module 13 can be isolated from both the quantum encryption and decryption module 12 and the privacy module 11; in this way, the security of the privacy module 11 and the security of the quantum encryption and decryption module 12 of the universal quantum secure device can be protected from being affected by data received by the communication module 13 from the external network.

4. The privacy module 11 does not communicate with the external network; in addition, encryption and decryption of the data can only be carried out in the quantum encryption and decryption module 12 of the universal quantum secure device. Hence, other devices in the external network are prevented from obtaining data before quantum encryption as well as data after quantum decryption, improving data security.

In order to ensure that data transmitted through the isolation module 14 is safe and reliable, on the basis of foregoing embodiments, in the present application, the isolation module 14 can further perform security verification on transmitted data.

The isolation module 14 in the universal quantum secure device is further adapted to manage the transmitted data to ensure the security of the privacy module 11 and the security of the quantum encryption and decryption module 12. Whether the data transmitted through the isolation module 14 is legal or not greatly affects the security of the universal quantum secure device. In light on this, in the present application, the isolation module 14 may perform security verification on the transmitted data to ensure that the transmitted data is safe and reliable, so as to prevent occurrence of security problems such as data being stolen and data being monitored in the universal quantum secure device. If the transmitted data passes the security verification, it means that the data is legal, and the transmission of the data is allowed; otherwise, it means that the data is illegal, and the transmission of the data is rejected.

It is to be noted that the isolation module 14 may transmit one or more of following kinds of data: application data, an encrypted message, quantum key data and decrypted application data.

In an example, security verification may be performed on characteristics such as byte length, field content and field type of the transmitted data.

Furthermore, in an example, the isolation module 14 may determine, based on a transmission path of received data, a verification manner corresponding to the data, and then perform security verification on the data with the verification manner. Exemplarily, two cases about the transmission path of the data may be illustrated as follows.

In a first case, the transmission path is a transmission path between the privacy module 11 and the quantum encryption and decryption module, which includes a transmission path from the privacy module 11 to the quantum encryption and decryption module and a transmission path from the quantum encryption and decryption module to the privacy module 11.

Since the privacy module 11 is an open system in terms of software system, i.e., a hardware external interface of the privacy module 11 is restricted while there is no restriction on system types of applications, the operating system of the privacy module 11 can receive and send out a variety of message data such as probe, heartbeat, etc. under normal circumstances. Based on this, in the present application, the isolation module 14 may preset a transmission requirement for a link layer of data that is allowed to be transmitted between the privacy module 11 and the quantum encryption and decryption module. In the case that the isolation module 14 determines that the transmission path of the received data to be transmitted is a transmission path between the privacy module 11 and the quantum encryption and decryption module, the isolation module 14 may determine whether a link layer of such data satisfies the preset transmission requirement. In response to determining that the data satisfies the preset transmission requirement, the data is indicated to be legal and it is determined that the data passes the security verification. In response to determining that the data does not satisfy the preset transmission requirement, the data is indicated to be illegal and it is determined that the data fails the security verification.

In an example, in order to eliminate the operating system of the privacy module 11 from blindly sending some non-compliant data to waste keys and key relay resources of the quantum encryption and decryption module 12, the transmission requirement may include a transmission requirement for data that the privacy module 11 is allowed to send (denoted as a first transmission requirement), for example, an Ether type of a link layer of the data that the privacy module 11 is allowed to send, a list of data that the privacy module 11 is allowed to send, etc. The isolation module 14 may, based on the first transmission requirement, perform a security verification on data sent by the privacy module 11, thereby filtering the data sent by the privacy module 11 to a certain extent. Exemplarily, if the isolation module 14 determines that the transmission path of the received data to be transmitted is a transmission path between the privacy module 11 and the quantum encryption and decryption module, the isolation module 14 may determine whether the link layer of the data sent by the privacy module 11 satisfies the preset first transmission requirement, and thus determine whether the data sent by the privacy module 11 passes the security verification.

For example, if the first transmission requirement is an Ether type of application data initiated by an application, in reception of data sent by the privacy module 11, the isolation module 14 may determine whether an Ether type of a link layer of the data is the Ether type of application data initiated by the application. If the Ether type of the link layer of the data is the Ether type of the application data initiated by the application, the data is indicated to be application data initiated by the application and it is determined that the data sent by the privacy module 11 passes the security verification. Otherwise, the data is indicated not to be application data initiated by the application and it is determined that the data sent by the privacy module 11 fails the security verification.

In another example, considering that there may be other data falsified by illegal devices and transmitted to the privacy module 11 via the isolation module 14, the transmission requirement may further include a transmission requirement (noted as a second transmission requirement) for data that the isolation module 14 is allowed to transmit to the privacy module 11, for example, an Ether type of a link layer of data that is allowed to be transmitted to the privacy module 11, a list of data that is allowed to be transmitted to the privacy module 11, etc. The isolation module 14 may determine whether a link layer of data to be transmitted to the privacy module 11 satisfies the preset second transmission requirement, thereby determining whether the data to be transmitted to the privacy module 11 passes the security verification. If the link layer of the data to be transmitted to the privacy module 11 satisfies the preset second transmission requirement, it is indicated that the data to be transmitted to the privacy module 11 is legal and it is determined that the data to be transmitted to the privacy module 11 passes the security verification. If the link layer of the data does not satisfy the preset second transmission requirement, it is indicated that the data is illegal and it is determined that the data to be transmitted to the privacy module 11 fails the security verification.

For example, if the second transmission requirement is an Ether type of data that is allowed to be transmitted, in reception of any piece of data transmitted to the privacy module 11, the isolation module 14 may determine whether an Ether type of a link layer of such data is the Ether type of data that is allowed to be transmitted. If the isolation module 14 determines that the Ether type of the link layer of such data is the Ether type of data that is allowed to be transmitted, such data is indicated to be legal and it is determined that the data to be transmitted to the privacy module 11 passes the security verification. If the isolation module 14 determines that the Ether type of the link layer of such data is not the Ether type of data that is allowed to be transmitted, such data is indicated to be illegal and it is determined that the data to be transmitted to the privacy module 11 fails the security verification.

In a second case, the transmission path is a transmission path between the quantum encryption and decryption module and the communication module 13, which includes a transmission path from the quantum encryption and decryption module to the communication module 13 and a transmission path from the communication module 13 to the quantum encryption and decryption module.

Under such transmission path, one or more of the following ways can be used to perform security verification on data in such transmission path.

Way 1: Transmission Format Verification.

If a certain piece of data is to be transmitted through the isolation module 14 in the transmission path between the quantum encryption and decryption module and the communication module 13, the data must be satisfying a pre-configured transmission format. Based on this, the isolation module 14, in the case of determining that a transmission path for received data which is to be transmitted is the transmission path between the quantum encryption and decryption module and the communication module 13, may determine whether an encapsulation format of the data satisfies the pre-configured transmission format. Exemplarily, in response to determining that the encapsulation format of the data satisfies the pre-configured transmission format, it is determined that the data passes the transmission format verification; in response to determining that the encapsulation format of the data does not satisfy the pre-configured transmission format, it is determined that the data fails the transmission format verification.

It should be noted that, the transmission format can be configured flexibly according to actual needs, and no specific limitations are made here.

Way 2: Dynamic Verification Code Verification.

Data transmitted in the transmission path between the quantum encryption and decryption module and the communication module 13 may carry a pre-agreed dynamic verification code, thereby ensuring that the source of the data is legal. For example, for any piece of data transmitted in the transmission path between the quantum encryption and decryption module and the communication module 13, if the source of the data is legal, then the data generally carries a pre-agreed dynamic verification code; otherwise, the data does not carry the dynamic verification code. Therefore, in the present application, the isolation module 14, in the case of determining that a transmission path for received data which is to be transmitted is the transmission path between the quantum encryption and decryption module and the communication module 13, may determine whether the data carries the pre-agreed dynamic verification code, and thus determine whether the data is from a legal source. In response to determining that the data carries the pre-agreed dynamic verification code, the source of the data is indicated to be legal and it is determined that the data passes the dynamic verification code verification. In response to determining that the data does not carry the pre-agreed dynamic verification code, the source of the data is indicated to be illegal and it is determined that the data fails the dynamic verification code verification.

Exemplarily, the quantum encryption and decryption module 12, when transmitting the transmitted data to the isolation module 14, may obtain a dynamic verification code, and reconstruct a link layer of the transmitted data based on a data type of the transmitted data and the dynamic verification code. The isolation module 14, in the case of determining that a transmission path for the transmitted data received by the isolation module 14 is the transmission path between the quantum encryption and decryption module and the communication module 13, may verify legitimacy of the dynamic verification code carried in the link layer of the transmitted data to determine whether the received transmitted data is legal or not, and thus determine whether or not to send the transmitted data to the communication module 13. If the isolation module 14 determines that the dynamic verification code carried in the transmitted data is consistent with the pre-agreed dynamic verification code, the isolation module 14 determines that the dynamic verification code carried in the transmitted data passes the dynamic verification code verification. If the isolation module 14 determines that the dynamic verification code carried in the transmitted data is inconsistent with the pre-agreed dynamic verification code, the isolation module 14 determines that the dynamic verification code carried in the transmitted data fails the dynamic verification code verification.

Further exemplarily, the communication module 13, upon receiving data sent from an external network, may also obtain a dynamic verification code, reconstruct a link layer of the data based on the dynamic verification code and a data type of the data, and then transmit the data to the isolation module 14. The isolation module 14, in the case of determining that a transmission path for received data to be transmitted is the transmission path between the quantum encryption and decryption module and the communication module 13, may determine whether the dynamic verification code carried in the data passes the dynamic verification code verification by determining whether the dynamic verification code carried in the data is consistent with the pre-agreed dynamic verification code. In response to determining that the dynamic verification code carried in the data is consistent with the pre-agreed dynamic verification code, the isolation module 14 determines that the dynamic verification code carried in the data passes the dynamic verification code verification; in response to determining that the dynamic verification code carried in the data is inconsistent with the pre-agreed dynamic verification code, the isolation module 14 determines that the dynamic verification code carried in the data fails the dynamic verification code verification.

In one possible implementation, the dynamic verification code may be configured into the universal quantum secure device by manual configuration, or the dynamic verification code may be configured and generated by means of negotiation among the quantum encryption and decryption module 12, the isolation module 14 and the communication module 13. Exemplarily, the quantum encryption and decryption module 12 may obtain the dynamic verification code with a pre-configured dynamic verification code obtaining approach. For example, a randomly generated sequence of numbers is determined as the dynamic verification code. The dynamic verification code is then encapsulated according to a pre-configured transmission format to obtain data corresponding to the dynamic verification code. The data is then sent to the isolation module 14. In acquisition of the data, the isolation module 14 acquires and saves the dynamic verification code carried by the data, and then transmits the data to the communication module 13. In acquisition of the data, the communication module 13 acquires the dynamic verification code carried by the data according to the pre-configured transmission format and saves the dynamic verification code; in this way, subsequently, the communication module 13 may further verify the acquired data based on the pre-agreed dynamic verification code.

Since the dynamic verification code might be stolen, which allows other external network devices to imitate data based on the stolen dynamic verification code, the security of the universal quantum secure device may be adversely affected. Therefore, in the present application, saved dynamic verification code may be updated randomly at any time. Exemplarily, if an update instruction for the dynamic verification code is obtained, a target dynamic verification code is obtained and the dynamic verification code is updated according to the target dynamic verification code. In other words, the quantum encryption and decryption module 12 may randomly, at any time, receive an update instruction for updating the pre-agreed dynamic verification code, and may update the saved dynamic verification code according to the target dynamic verification code carried in the update instruction, thereby preventing other external network devices from imitating data based on the stolen dynamic verification code and affecting the security of the universal quantum secure device, and improving data security. For example, the quantum encryption and decryption module 12 may obtain a target dynamic verification code by means of a pre-configured dynamic verification code obtaining approach. Based on the target dynamic verification code, the quantum encryption and decryption module 12 updates the saved dynamic verification code. Then the quantum encryption and decryption module 12 encapsulates the target dynamic verification code according to the pre-configured transmission format to obtain data corresponding to the target dynamic verification code, and sends the data to the isolation module 14. In reception of the data, if the isolation module 14 determines, according to the pre-configured transmission format, that the data carries an update instruction for updating the dynamic verification code, e.g., a handshake message is carried in a data link layer of the data, the isolation module 14 updates the saved dynamic verification code according to the target dynamic verification code carried in the data and transmits the data to the communication module 13. In acquisition of the data, the communication module 13 obtains the target dynamic verification code carried in the data according to the pre-configured transmission format, and updates the saved dynamic verification code based on the target dynamic verification code. For example, the communication module 13 extracts the handshake message from the data link layer of the data according to the pre-configured transmission format, and updates the saved dynamic verification code based on the target dynamic verification code carried by the handshake message in a network layer of the transmission format.

The target dynamic verification code is generated in a same way as the dynamic verification code, which is not repeated herein.

It is to be noted that the update instruction may be generated in accordance with a preset period, or at preset time points, or according to update operations of a user. In practical implementation, flexible settings can be made according to actual needs, and no specific limitations are made herein.

In an example, data requiring quantum decryption service received by the quantum encryption and decryption module 12 from the isolation module 14 also carries a dynamic verification code; accordingly, the quantum encryption and decryption module 12 may also perform a dynamic verification code verification on the data requiring quantum decryption service, and decrypt the data requiring quantum decryption service only in the case that the dynamic verification code verification is passed. Exemplarily, the isolation module 14 may reconstruct a link layer of the data requiring quantum decryption service based on the dynamic verification code and a data type of the data requiring quantum decryption service, and then transmit the data requiring quantum decryption service to the quantum encryption and decryption module 12. In reception of the data requiring quantum decryption service from the isolation module 14, the quantum encryption and decryption module 12 may verify the dynamic verification code carried by the data requiring quantum decryption service. If it is determined that the dynamic verification code of the data requiring quantum decryption service passes the verification, the data requiring quantum decryption service is indicated to be legal, and the data requiring quantum decryption service is decrypted; otherwise, the data requiring quantum decryption service is discarded.

Way 3: Hash Verification.

In an example, data to be transmitted by the isolation module 14 may include a data header and core data. Among them, the core data may include one or more of the following: service data, user data, key data, and service signaling data. It is understood that the service data is application layer data; the user data is data generated by a service application based on user operations, such as audio and video data, chat content data, and user file; the key data is attribute information corresponding to a key required for encrypting the data, such as an index corresponding to the key; and the service signaling data is data controlling the establishment and processing of the service. Since there may be a risk that the core data may be tampered with, in the present application, the isolation module 14, in the case of determining that a transmission path of the received data to be transmitted is the transmission path between the quantum encryption and decryption module and the communication module 13, may perform a hash verification on the core data carried by the data to determine whether the data may be tampered with, so as to ensure the security and integrity of the data.

In an example, the data may also carry a target verification code corresponding to the core data. The target verification code is determined, when generating the core data, based on a preset hash algorithm as well as the core data. The core data may be encrypted or unencrypted. If the core data is tampered with during transmission, a verification code determined based on tampered core data shall be different from the target verification code corresponding to the core data before the tampering. Therefore, in the present application, this isolation module 14, in the case of determining that the transmission path of the received data to be transmitted is the transmission path between the quantum encryption and decryption module and the communication module 13, may verify the data based on the target verification code carried in the data. Exemplarily, the isolation module 14, in the case of determining that the transmission path of the received data to be transmitted is the transmission path between the quantum encryption and decryption module and the communication module 13, obtains the core data carried in the data. The isolation module 14 determines a verification code corresponding to the core data based on the core data and the preset hash algorithm, and compares the verification code with the target verification code carried in the data. If it is determined that the verification code is consistent with the target verification code, it is indicated that the core data has not been tampered with and it is determined that the data passes the hash verification; if it is determined that the verification code is inconsistent with the target verification code, it is indicated that the core data has been tampered with and it is determined that the data fails the hash verification.

For example, if the target verification code is determined based on encrypted core data, the isolation module 14 extracts the encrypted core data as well as the target verification code from the data, obtains a verification code corresponding to the encrypted core data based on the preset hash algorithm and the encrypted core data, and determines whether the verification code is consistent with the target verification code. If it is determined that the verification code is consistent with the target verification code, it is indicated that the encrypted core data has not been tampered with and it is determined that the data passes the hash verification; if it is determined that the verification code is inconsistent with the target verification code, it is indicated that the encrypted core data has been tampered with and it is determined that the data fails the hash verification.

As another example, if the target verification code is determined based on unencrypted core data, the isolation module 14 decrypts the data, obtains the unencrypted core data, obtains a verification code corresponding to the unencrypted core data based on the preset hash algorithm and the unencrypted core data, and determines whether the verification code is consistent with the target verification code carried in the data. If it is determined that the verification code is consistent with the target verification code, it is indicated that the unencrypted core data has not been tampered with and it is determined that the data passes the hash verification; if it is determined that the verification code is inconsistent with the target verification code, it is indicated that the core data has been tampered with and it is determined that the data fails the hash verification.

Way 4: Data Type Verification.

When it comes to a data type of data transmitted between the quantum encryption and decryption module and the communication module 13, the data type at least includes encrypted message and service signaling. Therefore, considering the data type of the data transmitted between the quantum encryption and decryption module and the communication module 13, manners of verification corresponding to different data types may be pre-configured in the isolation module 14 to verify the data transmitted between the quantum encryption and decryption module and the communication module 13, so as to ensure the security of data transmission. For example, a manner of verification corresponding to the encrypted message may be whether an encryption format of the encrypted message satisfies a pre-configured standard encryption format, and a manner of verification corresponding to the service signaling may be whether the service signaling data is in a pre-configured black list or a pre-configured white list. Exemplarily, the isolation module 14, in the case of determining that a transmission path of the received data to be transmitted is the transmission path between the quantum encryption and decryption module and the communication module 13, may determine a target data type corresponding to data content of the data. Then, the isolation module 14 determines, based on pre-configured correspondence between data types and manners of verification, a manner of verification corresponding to the target data type (noted as a target verification manner), and determines whether the data passes the manner of verification corresponding to the target data type. If it is determined that the data passes the manner of verification corresponding to the target data type, the data is indicated to be legal and it is determined that the data passes the data type verification; if it is determined that the data fails the manner of verification corresponding to the target data type, the data is indicated to be illegal and it is determined that the data fails the data type verification.

Taking data whose data type is encrypted message as an example, a data header of a generally legal encrypted message satisfies the pre-configured standard encryption format, e.g., a data header of an encrypted message after quantum encryption satisfies a pre-configured quantum encryption format. Therefore, if acquired data is an encrypted message, it may be determined whether an encryption format of the data satisfies the pre-configured standard encryption format. If the encryption format of the data satisfies the pre-configured standard encryption format, the data is indicated to be legal and it is determined that the data passes the data type verification; if the encryption format of the data does not satisfy the pre-configured standard encryption format, the data is indicated to be illegal and it is determined that the data fails the data type verification.

It is to be noted that the standard encryption format may be set flexibly according to actual needs, and no specific limitation is made herein. Exemplarily, the standard encryption format may be set by stipulating the legality of information contents such as a network access identification of a transmitter, an identification of the encrypted message, and an encryption type of the encrypted message, so that only encrypted messages carrying stipulated information contents satisfy the standard encryption format. Among them, the network access identification of the transmitter is used for a legal identity of the transmitter in quantum secure network. The encryption type includes Quantum Encryption, Pretty Good Privacy (PGP), Advanced Encryption Standard (AES), Triple Data Encryption Algorithm (TDEA), and RSA encryption algorithm, etc. The identification of the encrypted message is used to indicate an ID of the encrypted message.

Taking data whose data type is service signaling as an example, a signaling list associated with service signaling data may be configured in advance based on legal service signaling data or illegal service signaling data (e.g., short byte commands, etc.) that may be received by the isolation module 14. For example, a signaling list (noted as a first signaling list), such as a white list, etc., is set up based on the legal service signaling data that the isolation module 14 is allowed to transmit, and a signaling list (noted as a second signaling list), such as a black list, etc., is set up based on the illegal service signaling data that may occur in actual application. Exemplarily, if it is determined that the target data type of the data is service signaling, a signaling list associated with service signaling (which may include the first signaling list and the second signaling list) is obtained, and it is determined whether target service signaling data carried by the data matches any piece of service signaling data in the pre-configured signaling list, so as to determine whether or not the data passes the data type verification.

It should be noted that service signaling data in the first signaling list is service signaling data that is permitted to be transmitted, while service signaling data in the second signaling list is service signaling data that is prohibited to be transmitted.

In an example that the first signaling list is pre-configured, if it is determined that the target service signaling data carried by the data matches any piece of the service signaling data in the pre-configured first signaling list, it is indicated that the target service signaling data is legal service signaling data and it is determined that the data passes the data type verification.

In a possible implementation, if it is determined that the target service signaling data carried by the data matches none of the service signaling data in the pre-configured first signaling list, it is indicated that the target service signaling data is illegal service signaling data and it is determined that the data fails the data type verification.

In an example that the second signaling list is pre-configured, if it is determined that the target service signaling data carried by the data does not match any piece of the service signaling data in the pre-configured second signaling list, it is indicated that the target service signaling data is legal service signaling data, then it is determined that the data passes the data type verification.

In a possible implementation, if it is determined that the target service signaling data carried by the data matches any piece of the service signaling data in the pre-configured second signaling list, it is indicated that the target service signaling data is illegal service signaling data, then it is determined that the data fails the data type verification.

In an example that the first signaling list and the second signaling list are pre-configured, if it is determined that the target service signaling data carried by the data matches any piece of the service signaling data in the pre-configured first signaling list and does not match any piece of the service signaling data in the pre-configured second signaling list, it is indicated that the target service signaling data is legal service signaling data, then it is determined that the data passes the data type verification.

In a possible implementation, if it is determined that the target service signaling data carried by the data does not match any piece of the service signaling data in the pre-configured first signaling list, or that the target service signaling data matches any piece of the service signaling data in the pre-configured second signaling list, it is indicated that the target service signaling data is illegal service signaling data, then it is determined that the data fails the data type verification.

It is to be noted that the isolation module 14 may adopt one or more of the above-mentioned ways to perform security verification on the data communicated between the quantum encryption and decryption module and the communication module 13. In the case where the isolation module 14 adopts multiple ways to perform security verification on the data communicated between the quantum encryption and decryption module and the communication module 13, the data is required to pass security verification of each of the multiple ways before it is transmitted. For example, the isolation module 14 adopts the above-mentioned way 1, way 2 and way 3, and in determining that received data passes the verification of each of way 1, way 2 and way 3, the data is allowed to be transmitted; otherwise, the data is discarded. Alternatively, the isolation module 14 adopts the above-mentioned way 1, way 2 and way 4, in determining that received data passes the verification of each of way 1, way 2 and way 4, the data is allowed to be transmitted; otherwise, the data is discarded. Alternatively, the isolation module 14 adopts the above-mentioned way 1 and way 2, in determining that received data passes the verification of each of way 1 and way 2, the data is allowed to be transmitted; otherwise, the data is discarded.

In the present application, the isolation module 14 performs security verification on the data to be transmitted, allows the data to be transmitted only when the data passes the security verification, and discards the data when the data fails the security verification, thereby ensuring the data transmitted by the isolation module 14 to be legal and secure.

In order to ensure that the application data is secure during transmission, on the basis of the above embodiments, in the present application, the quantum encryption and decryption module 12 has a function of encrypting, based on an acquired key, data transmitted by the isolation module 14 that requires quantum encryption service. A key used for encrypting the data is determined based on a quantum random number. Since the quantum random number used to determine the key used for the quantum encryption service is random and different each time, the key determined based on the quantum random number is also random and different each time, ensuring that the key is determined just before usage and cannot be predicted.

In a possible implementation, the quantum encryption and decryption module 12 may include an encryption and decryption sub-unit and a key management sub-unit. The key management sub-unit is used to store and allocate a key, and the encryption and decryption sub-unit is used to obtain a key from the key management sub-unit and encrypt or decrypt data based on the key. Exemplarily, the encryption and decryption sub-unit, in acquisition of the application data, may obtain a first key from the key management sub-unit and encrypt the application data based on the first key to obtain first ciphertext data. Further exemplarily, the encryption and decryption sub-unit may obtain a second key from the key management sub-unit based on quantum key data corresponding to second ciphertext data and decrypt the second ciphertext data based on the second key to obtain decrypted application data.

In a possible implementation, the quantum encryption and decryption module 12 may, before obtaining the first key for encrypting the data requiring quantum encryption service, obtain an encryption parameter corresponding to the data requiring quantum encryption service, and obtain, based on the encryption parameter, the first key required for encrypting the data requiring quantum encryption service from the quantum random number. The encryption parameter includes one or more of the following: an encryption strength, a capacity of the application data. Optionally, since the quantum encryption and decryption module 12 in the universal quantum secure device may have at least one key pool saved, the encryption parameter may also include information of a key pool, such as identification information of the key pool, to facilitate the quantum encryption and decryption module 12 in determining from which saved key pool to obtain the first key. Then, based on the first key, the data requiring quantum encryption service is encrypted to obtain the first ciphertext data.

For example, if the quantum encryption and decryption module 12 includes an encryption and decryption sub-unit and a key management sub-unit, the encryption and decryption sub-unit, in acquisition of the application data, may obtain an encryption parameter corresponding to the application data and send the encryption parameter to the key management sub-unit. In reception of the encryption parameter corresponding to the application data, the key management sub-unit may determine, based on the encryption parameter and a preset key generation rule, a first key from saved quantum random numbers, where the first key is allocated for the application data. The encryption and decryption sub-unit obtains the first key allocated by the key management sub-unit, and encrypts the application data based on the first key.

In a possible implementation, the quantum encryption and decryption module 12 may, before encrypting the data requiring quantum encryption service, obtain a verification code of the data requiring quantum encryption service, and then encrypt the data requiring quantum encryption service as well as the verification code based on the first key to obtain the first ciphertext data; in this way, the peer device, after decrypting the first ciphertext data, may verify the decrypted data based on the verification code, thereby determining the integrity as well as the security of the decrypted data.

The insecurity of traditional encryption algorithms can be avoided by encrypting data that requires quantum encryption service. A different key is used for encryption each time; hence, theoretically, the data can be absolutely secure. In addition, the quantum encryption does not have reversibility and predictability of decryption results as traditional encryption algorithms, a plaintext content of the data after quantum encryption cannot be accurately known even through violent means of decryption.

In an example, the quantum encryption and decryption module 12, in acquisition of the data requiring quantum encryption service, may perform verification, such as hash verification, on the data requiring quantum encryption service and obtain a verification code corresponding to the data requiring quantum encryption service, so as to ensure that a device that receives the data requiring quantum encryption service later may determine the security and integrity of the data requiring quantum encryption service based on the verification code. In response to determining that the data requiring quantum encryption service passes the verification, the quantum encryption and decryption module 12 may encrypt the data requiring quantum encryption service and the verification code based on the first key obtained in foregoing embodiments to obtain the first ciphertext data.

In the present application, the quantum encryption and decryption module 12 may encrypt the data requiring quantum encryption service based on the acquired first key and a preset encryption manner, the preset encryption manner may include one or more of following manners.

Manner 1: full encryption manner, i.e., encrypting data which does not belong to a link layer in the data requiring quantum encryption service.

If the preset encryption manner is full encryption manner, the quantum encryption and decryption module 12, in acquisition of the data requiring quantum encryption service, may encrypt the data that does not belong to the link layer in the data requiring quantum encryption service based on the acquired first key and a first preset encryption algorithm, to obtain ciphertext data.

Manner 2: load encryption mode, i.e., encrypting only application layer data in the data that requires quantum encryption service.

If the preset encryption manner is load encryption manner, the quantum encryption and decryption module 12, in acquisition of the data requiring quantum encryption service, may encrypt the application layer data in the data requiring quantum encryption service based on the acquired first key and a second preset encryption algorithm.

In an example, in order to avoid problems such as missing or tampering of application layer data of the data requiring quantum encryption service during transmission, an application, when initiating the data requiring quantum encryption service, may obtain a checksum corresponding to the application layer data (denoted as a second checksum) based on the application layer data and a preset checksum algorithm, and carry the second checksum in the data requiring quantum encryption service. With the second checksum carried in the data requiring quantum encryption service, it can be determined whether the application layer data in the data requiring quantum encryption service is missing, tampered with, or the like, thereby ensuring the security and reliability of data communication. If the quantum encryption and decryption module 12 adopts the load encryption manner to encrypt the data requiring quantum encryption service, after the data requiring quantum encryption service is encrypted by the quantum encryption and decryption module 12, a checksum corresponding to encrypted application layer data changes. In consideration of this, the quantum encryption and decryption module 12, after obtaining the first ciphertext data, may determine the checksum corresponding to the application layer data in the first ciphertext data (noted as a first checksum) based on the preset checksum algorithm, and update the second checksum carried by the first ciphertext data based on the first checksum.

The first preset encryption algorithm may be the same as or different from the second preset encryption algorithm.

It is to be noted that the encryption manner may be pre-configured in the quantum encryption and decryption module 12, or it may be configured manually. In an example that the encryption manner is configured manually, the universal quantum secure device may display, through a connected display, an encryption manner configuration interface provided by an agent of an application installed in the privacy module 11, and a staff may select an encryption manner by operating the encryption manner configuration interface. After receiving an input encryption manner, the agent of the application sends the encryption manner to the quantum encryption and decryption module 12. Additionally, the staff can configure encryption ratio, encryption algorithm, and other information of the quantum encryption and decryption module 12 through the interface provided by the agent of the application, where the encryption ratio characterizes a ratio between a unit key and a capacity of data that can be encrypted by the unit key.

With the above-described manners, the data requiring quantum encryption service can be avoided from being intercepted, monitored, or tampered with by an illegal device during transmission, thereby ensuring the security of the data requiring quantum encryption service during network transmission.

In the present application, the quantum encryption and decryption module 12 may also receive data requiring quantum decryption service transmitted by the isolation module 14, and may decrypt the data requiring quantum decryption service based on quantum key data corresponding to the data requiring quantum decryption service, to obtain decrypted application data. However, in practical application, the quantum key data corresponding to the data requiring quantum decryption service is relayed to the universal quantum secure device through a quantum secure network, while the data requiring quantum decryption service is transmitted to the universal quantum secure device through a conventional network, so the data requiring quantum decryption service and the quantum key data corresponding to the data requiring quantum decryption service cannot be transmitted and simultaneously arrive at the universal quantum secure device; hence, the quantum encryption and decryption module 12 may have not acquired quantum key data corresponding to data requiring quantum decryption service when decrypting the data requiring quantum decryption service, or the quantum encryption and decryption module 12 may have not acquired data requiring quantum decryption service when receiving quantum key data corresponding to the data requiring quantum decryption service. Based on this, in the present application, if the quantum encryption and decryption module 12 acquires certain data requiring quantum decryption service and has not acquired the quantum key data corresponding to the data requiring quantum decryption service, the quantum encryption and decryption module 12 may cache the data requiring quantum decryption service, wait for acquiring the quantum key data corresponding to the data requiring quantum decryption service, and decrypt the data requiring quantum decryption service based on the quantum key data; if the quantum encryption and decryption module 12 only acquires quantum key data corresponding to certain data requiring quantum decryption service and has not acquired the data requiring quantum decryption service, the quantum encryption and decryption module 12 may cache the quantum key data corresponding to the data requiring quantum decryption service and wait for acquiring the data requiring quantum decryption service.

For example, if the quantum encryption and decryption module 12 determines that it has received an encrypted message sent by the isolation module 14, the quantum encryption and decryption module 12 obtains a key sequence from the encrypted message according to preconfigured protocol specifications. If target quantum key data carrying the key sequence is not obtained from all cached quantum key data, the quantum encryption and decryption module 12 waits until receiving the target quantum key data carrying the key sequence. If the target quantum key data carrying the key sequence is obtained from all cached quantum key data, the quantum encryption and decryption module 12 obtains a second key corresponding to the encrypted message by correspondingly processing the target quantum key data, and decrypts second ciphertext data included in the encrypted message according to the second key to obtain the decrypted application data.

In a possible implementation, the data requiring quantum decryption service may include a verification code (noted as a first verification code), which corresponds to the application data when the application data is encrypted. After decrypting the second ciphertext data in the data requiring quantum decryption service according to the embodiments described above, the first verification code as well as the decrypted application data may be obtained. The quantum encryption and decryption module 12 may perform a verification, e.g., a hash verification, on the decrypted application data to obtain a verification code (noted as a second verification code) currently corresponding to the decrypted application data. Based on the first verification code and the second verification code, the security and integrity of the decrypted application data are determined. For example, whether the decrypted application data is secure and complete may be determined based on whether the first verification code and the second verification code are identical. If it is determined that the first verification code and the second verification code are identical, it is determined that the decrypted application data is secure and complete; if it is determined that the first verification code and the second verification code are inconsistent, it is indicated that the decrypted application data is insecure or incomplete, and the decrypted application data is filtered.

In order to ensure accurate relaying of the quantum key data to the peer device, on the basis of the above embodiments, in the present application, the quantum encryption and decryption module 12 obtains a network access identification corresponding to each of at least one IP address.

In one example, a network identification corresponding to each of the at least one IP address may be obtained in at least one of the following ways.

Way 1: Manual Configuration.

The universal quantum secure device may display, via a connected display, a network access identification configuration interface provided by an agent of an application installed in the privacy module 11, and a staff may input a network access identification corresponding to each of the at least one IP address by operating the network access identification configuration interface. Optionally, the staff may also input the at least one IP address. In reception of the inputted network access identification corresponding to each of the at least one IP address, the agent of the application sends the network access identification corresponding to each of the at least one IP address to the quantum encryption and decryption module 12; hence, the quantum encryption and decryption module 12 can determine a correspondence between IP address and network access identification based on the at least one IP address and the network access identification corresponding to each of the at least one IP address.

Way 2: Provided by a Quantum Secure Domain Name Resolution Device.

In the present application, a correspondence between an IP address and a network access identification is configured in the quantum secure domain name resolution device. The universal quantum secure device may query the quantum secure domain name resolution device for the network access identification corresponding to a particular IP address. Optionally, the universal quantum secure device may also receive the IP address from the quantum secure domain name resolution device. After the communication module 13 of the universal quantum secure device receives the network access identification corresponding to the IP address provided by the quantum secure domain name resolution device, the communication module 13 sends the network access identification corresponding to the IP address to the quantum encryption and decryption module 12 of the universal quantum secure device via the isolation module 14, so that the quantum encryption and decryption module 12 can determine, based on the IP address and the network access identification corresponding to the IP address, the correspondence between the IP address and the network access identification.

Way 3: Provided by a Quantum Secure Application Service Device.

In the present application, the quantum secure application service device of an application is configured with a network access identification corresponding to an IP address of at least one quantum secure terminal using the application. The universal quantum secure device sends an acquisition instruction to the quantum secure application service device of the application in order to acquire the network access identification corresponding to each of the at least one IP address from the quantum secure application service device through the acquisition instruction. Optionally, the quantum secure application service device may further send the IP address of the at least one quantum secure terminal using the application to the universal quantum secure device. In acquisition of the acquisition instruction, the quantum secure application service device sends a stored network access identification corresponding to each of the at least one IP address to the universal quantum secure device. The communication module 13 of the universal quantum secure device, in reception of the network access identification corresponding to each of the at least one IP address provided by the quantum secure application service device, sends the network access identification corresponding to each of the at least one IP address to the quantum encryption and decryption module 12 of the universal quantum secure device via the isolation module 14, so that the quantum encryption and decryption module 12 can determine, based on the at least one IP address and the network access identification corresponding to each of the at least one IP address, a correspondence between the at least one IP address and the network access identification corresponding to each of the at least one IP address.

In order to ensure that the application data is accurately sent to a peer device, on the basis of the above embodiments, in the present application, the quantum encryption and decryption module 12 also obtains a reachable IP address of a communication module of a peer device corresponding to each of at least one IP address.

It is to be noted that ways of obtaining the the reachable IP address of the communication module of the peer device corresponding to each of the at least one IP address are similar to ways of obtaining the network access identification corresponding to each of the at least one IP address as described above, and will not be repeated herein.

Based on the above embodiments, the quantum encryption and decryption module 12 can map a destination IP address to a network access identification of the peer device and a reachable IP address of a communication module of the peer device, which is conducive to subsequently sending the first ciphertext data as well as the quantum key data to the peer device accurately.

In order to ensure the legitimacy of the data sent by the communication module 13, on the basis of the above embodiments, in the present application, after receiving the data to be sent (e.g., transmission data) transmitted by the isolation module 14, the communication module 13 may further perform security verification on the data to be sent. Only the data that passes the security verification can be sent to the peer device by the communication module 13.

Exemplarily, the communication module 13 may perform security verification on the transmission data in several ways as follows.

Way A, a transmission requirement (noted as a third transmission requirement) for data that can be sent by the communication module 13 is preset, for example, an Ether type of a link layer of the data allowed to be sent, a list of data allowed to be sent, and the like. Exemplarily, after receiving data to be sent, the communication module 13 determines whether the data to be sent satisfies the preset third transmission requirement based on a link layer of the data to be sent. If the communication module 13 determines, based on the link layer of the data to be sent, that the data to be sent does not satisfy the preset third transmission requirement, the data to be sent is discarded; otherwise, the data to be sent is sent to the peer device based on the link layer of the data to be sent.

Way B, in a procedure of transmitting the data to be sent to the communication module 13 by the isolation module 14, the isolation module 14 may also reconstruct the link layer of the data to be sent based on a data type of the data to be sent and a dynamic verification code, and then send the data to be sent to the communication module 13. In reception of the data to be sent transmitted by the isolation module 14, the communication module 13 may verify the legitimacy of the dynamic verification code carried in the link layer of the data to be sent, thereby determining whether the received data to be sent is legal, and thereby determining whether to send the data to be sent to the peer device. Exemplarily, if it is determined that the dynamic verification code carried by the data to be sent passes the verification, it is indicated that the data to be sent is legal, and the communication module 13 sends the data to be sent to the peer device based on the link layer of the data to be sent. For example, if the communication module 13 determines that the dynamic verification code carried by the transmission data is consistent with a pre-agreed dynamic verification code, the communication module 13 determines that the dynamic verification code carried by the transmission data passes the verification. Further exemplarily, if it is determined that the dynamic verification code carried by the data to be sent fails the verification, it is indicated that the data to be sent is illegal, the communication module 13 discards the data to be sent. For example, if the communication module 13 determines that the dynamic verification code carried by the transmission data is inconsistent with the pre-agreed dynamic verification code, it is determined that the dynamic verification code carried by the transmission data fails the verification.

It is to be noted that the communication module 13 may adopt one or more of the above-mentioned ways to perform security verification on the data to be sent. When the communication module 13 adopts multiple ways to perform security verification on the data to be sent, the data to be sent is permitted to be sent to the peer device only if the data to be sent passes the security verification of each way. For example, if the communication module 13 employs way A and way B for security verification of the data to be sent, only if the data to be sent passes the verification of way A and the verification of way B, the data to be sent is legal, and the communication module 13 sends the data to be sent to the peer device based on the link layer of the data to be sent; if the data to be sent does not pass the verification of way A or the verification of way B, it is indicated that the data to be sent is illegal, the communication module 13 discards the data to be sent.

Based on the above embodiments, the communication module 13 can perform security verification on transmission data to be sent to the external network, thereby preventing illegal devices from stealing the application data in the privacy module 11 and protecting the security of the universal quantum secure device.

If the communication module 13 determines to send the received transmission data according to the above-described embodiments, the communication module 13 may send the transmission data to the peer device based on the link layer of the transmission data. Exemplarily, the communication module 13 sending the transmission data to the peer device based on the link layer of the transmission data may include the following two situations.

Situation I: determining, based on the link layer of the transmission data, that the transmission data includes first transmission data.

If it is determined, based on the link layer of the transmission data, that the transmission data includes first transmission data, it is indicated that the transmission data carries first ciphertext data, and it is necessary to send the first ciphertext data to the peer device through a conventional network, the communication module 13 sends the first ciphertext data carried by the first transmission data to the peer device based on a reachable IP address of a communication module of the peer device, the reachable IP address being carried by the first transmission data.

For example, the communication module 13 may determine, based on the reachable IP address of the communication module of the peer device, whether a link to the reachable IP address of the communication module of the peer device (noted as a first link) has been created. If the first link to the reachable IP address of the communication module of the peer device has been created, the first ciphertext data is sent to the peer device through the first link. If no first link to the reachable IP address of the communication module of the peer device has been created, first, a link to the reachable IP address of the communication module of the peer device is created, and then the first ciphertext data is sent to the peer device through the link.

Situation II: determining, based on the link layer of the transmission data, that the transmission data includes second transmission data.

If it is determined, based on the link layer of the transmission data, that the transmission data includes second transmission data, it is indicated that the transmission data carries quantum key data, and it is necessary to send the quantum key data to the peer device through a quantum secure network, the communication module 13 sends, based on base station communication information carried by the second transmission data, the quantum key data carried by the second transmission data to a quantum secure base station in the quantum secure network, so that the quantum key data is sent to the peer device via the quantum secure base station.

For example, the communication module 13 may determine, based on the base station communication information, whether a link to the base station communication information (noted as a second link) has been created. If the second link to the base station communication information has been created, the quantum key data is sent to the quantum secure base station through the second link; if no second link to the base station communication information has been created, a second link to the base station communication information is first created, and then the quantum key data is sent to the quantum secure base station through the second link.

After obtaining the quantum key data, the quantum secure base station may obtain a first key based on a key index carried in the quantum key data, and then relay the first key to the peer device based on a network access identification carried in the quantum key data.

In a possible implementation, the universal quantum secure device may be connected to an external device (noted as a peripheral for ease of description) such as a monitor, a keyboard, a mouse, and a camera, etc., in order to facilitate a user in operating the universal quantum secure device, improving user experience.

Since the universal quantum secure device includes a privacy module 11 and a communication module 13, and both modules can be used by a user as personal service processing, the user can choose whether to process information in the privacy module 11 or the communication module 13 according to the confidentiality of to-be-processed information, and when the user needs to switch from one module to the other, the user can switch through a peripheral switching module. There are many ways of switching, and the specific implementation process can be flexibly set according to the actual needs, for example, the universal quantum secure device supports switching through a device physical key such as a switch button, etc., and supports switching through a desktop key event software, i.e., the user only needs to click on a desktop switching button through a mouse, the switching between the privacy module 11 and the communication module 13 can take place. Of course, the universal quantum secure device can also support switching by the way of voice command, i.e., the user only needs to input a pre-configured switching password, e.g., "switch to privacy module 11", etc., the switching between the privacy module 11 and the communication module 13 can occur. For all of the above switching ways, a signal is sent to a dedicated switching hardware corresponding to the peripheral switching module, which in turn performs the switching of modules to which the peripheral is connected through the dedicated switching hardware of the universal quantum secure device, so that the peripheral can realize high-speed and non-perceptual switching, and the switching of the circuit is carried out on the hardware. During the switching process, there will not be any signal or data interaction between the privacy module 11 and the communication module 13, so that the peripheral connected to the privacy module 11 and the communication module 13 will not be cross-utilized for software logic.

By means of the peripheral switching module, not only the common use of hardware peripheral is realized, but it also ensures that the peripheral connected to the universal quantum secure device is only allowed to be connected to the privacy module 11 or the communication module 13 at a moment, i.e., the peripheral is unable to be connected to both the privacy module 11 and the communication module 13 at any moment; hence, it realizes the hardware isolation of the data stored by the privacy module 11 in the universal quantum secure device, i.e., the security of the data stored in the privacy module 11 in the universal quantum secure device is also ensured in terms of the peripheral.

Exemplarily, when a user operates the universal quantum secure device for switching a peripheral, for example, operates a device physical key of the universal quantum secure device to connect the peripheral to the communication module 13 of the universal quantum secure device, the peripheral switching module may receive a switching signal (noted as a first switching signal) and respond to the first switching signal by turning off a line connection between the privacy module 11 and the peripheral switching module, and turning on a line connection between the communication module 13 and the peripheral switching module. When the user operates the universal quantum secure device for peripheral switching, for example, operates a desktop button displayed on a monitor to which the universal quantum secure device is connected to connect the peripheral to the privacy module 11 of the universal quantum secure device, the peripheral switching module may receive a switching signal (noted as a second switching signal) and respond to the second switching signal by turning on the line connection between the privacy module 11 and the peripheral switching module and turning off the line connection between the communication module 13 and the peripheral switching module.

For millisecond switching of public peripheral such as monitor, mouse, keyboard, camera, and audio, peripheral switching module developed based on logic circuits can quickly switch peripheral between privacy module 11 and communication module 13, providing safe and reliable public device peripherals for privacy module 11 and communication module 13, reducing costs and improving operational comfort. Multiple switching modes such as hard keys and soft commands are supported, users in process of using can easily initiate at any time to switch without affecting operations of the privacy module 11 and communication module 13, to ensure the public use of the hardware peripheral. Work areas respectively corresponding to the privacy module 11 and the communication module 13 are separated, although the privacy module 11 and the communication module 13 both can use the hardware peripheral, the hardware peripheral will only be used by one module at a moment due to ensurance of the logic circuitry; hence, the security of data across the universal domain is also guaranteed in terms of peripheral use.

In a possible implementation, the quantum encryption and decryption module 12 of the universal quantum secure device further includes a curing data sub-unit, which is used to store initialization configuration data of the universal quantum secure device.

The initialization configuration data includes, but is not limited to, one or more of the following: a device identification, a device verification code, and the like.

The curing data sub-unit is a module set for storing the initialization configuration data of the universal quantum secure device, and the curing data sub-unit is also located in the quantum encryption and decryption module 12 of the universal quantum secure device. To realize the storage function, the curing data sub-unit may include at least one piece of memory chip. When the universal quantum secure device leaves factory, the staff sets some initialization configuration data into the memory chip that does not lose data in case of power-down, and the memory chip supports only one time of writing. Subsequently, once the universal quantum secure device is shipped out of the factory, the initialization configuration data stored in the memory chip can only be read by the user and cannot be written by the user again, so as to realize that the hardware characteristics of the memory chip ensure that it cannot be written, erased, or changed again after being shipped out of the factory.

Based on the above embodiments, during use of the universal quantum secure device after being shipped out of the factory, the initialization configuration data in the memory chip (ROM) can only be accessed via a data port provided by a dedicated logic hardware, and may be indirectly accessed by a parameter interface of a module included in the quantum encryption and decryption module 12. A module included in the communication module 13 cannot access the initialization configuration data stored in the memory chip from the beginning to the end, thus realizing that it cannot be modified by the user and cannot be accessed by the communication module 13, and guaranteeing the security of the device leaving the factory.

In a possible implementation, the universal quantum secure device may also be subject to a firmware upgrade. Specifically, the quantum encryption and decryption module 12 is further used to obtain version update data and perform a firmware upgrade of the universal quantum secure device based on the version update data.

The universal quantum secure device may obtain the version update data sent from the external network by the way in the above embodiments, or it may obtain the version update data by the way of connecting to a peripheral. During the specific implementation, the settings can be made according to the actual needs, and no specific limitations are made herein.

Exemplarily, the quantum encryption and decryption module 12 may include a firmware upgrade sub-unit, which is used to obtain version update data, and perform a firmware upgrade of the universal quantum secure device based on the version update data, ensuring secure upgrade of the firmware of the universal quantum secure device.

In some possible implementations, the quantum encryption and decryption module 12 is further used to determine that the version update data passes the integrity verification prior to performing the firmware upgrade of the universal quantum secure device based on the version update data.

For example, the quantum encryption and decryption module 12 obtains version update data for firmware upgrade according to the above embodiments, and then performs an integrity verification on the version update data. If it is determined that the version update data passes the integrity verification, the version update data may be sent to the firmware upgrade sub-unit. The firmware upgrade sub-unit distributes the received version update data to a corresponding dedicated hardware via a hardware GPIO interface, so that the dedicated hardware receiving the version update data can perform upgrade or modification according to the version update data.

In the present application, the firmware upgrade of the universal quantum secure device can be realized by means of a dedicated firmware upgrade sub-unit. Since the firmware upgrade sub-unit is located in the quantum encryption and decryption module 12, initialization configuration data of the firmware upgrade sub-unit is stored in a memory element within the quantum encryption and decryption module 12, which ensures the security of the firmware upgrade process.

In some possible implementations, for the firmware upgrade of the isolation module 14, the firmware upgrade sub-unit may upgrade the isolation module 14 through a pre-configured dedicated upgrade interface without occupying a data transmission channel of the isolation module 14, thereby facilitating the firmware upgrade of the universal quantum secure device, and yet ensuring the safety and stability of the entire firmware upgrade process.

The firmware upgrade sub-unit included in the quantum encryption and decryption module 12 can realize the firmware upgrade of the universal quantum secure device, and the version update data used for the firmware upgrade is transmitted in the form of ciphertext to the quantum encryption and decryption module 12, which ensures the security of the version update data during transmission. Additionally, the quantum encryption and decryption module 12 verifies the received version update data, and the firmware upgrade can be performed on the universal quantum secure device only in case that the received version update data passes the verification, thereby improving the security of the firmware upgrade of the universal quantum secure device. For the upgrade of the isolation module 14, the firmware upgrade sub-unit may upgrade the isolation module 14 through a pre-configured dedicated upgrade interface, thereby not occupying the data transmission channel of the isolation module 14.

The universal quantum secure device further includes a power management module. The power management module is connected to each of the privacy module 11 and the communication module 13, for controlling a powered state of at least one module in the universal quantum secure device that is connected to the power management module.

The powered state includes, but is not limited to, one or more of the following: startup, shutdown, restart, and energy saving mode.

The power management module may be a hardware switch, where the user realizes the powered states of the privacy module 11 and the communication module 13 within the universal quantum secure device by controlling the hardware switch on the universal quantum secure device; or the power management module may be a logical switch, where the user realizes the powered states of the privacy module 11 and the communication module 13 within the universal quantum secure device by operating the logical switch on a user interface which is displayed on a peripheral monitor connected to the universal quantum secure device. For example, the user, depending on his or her needs, may suspend the modules that do not need to work (e.g., the privacy module 11, the communication module 13) or wake up the suspended modules by operating the logic switch on the user interface displayed on the peripheral monitor connected to the universal quantum secure device, so as to achieve energy saving.

The main purpose of the power management module is to control the switch-on/switch-off function of different modules of the universal quantum secure device, in order to facilitate the flexible switching-off/switching-off of at least one module within the universal quantum secure device under the premise that there is only one master switch, and secondly, for the purpose of energy saving and emission reduction, when the user is using only one module, he/she can power down a module that does not need to work to save energy. In addition, the power management module can also be linked with other working modules, for example, the power management module can detect that when the user is turning off a certain module, the operating system of the universal quantum secure device can automatically cut to other working modules, so as to allow the user to have a smooth using feeling.

FIG. 2 shows a schematic diagram of a structure of a power control module provided by an embodiment of the present application. As shown in FIG. 2, a power switch of the universal quantum secure device is connected to each of the power control module and a main power supply. An auxiliary power supply of the universal quantum secure device is used to detect a state of the power switch, and when it is detected that a user turns on the power switch, the auxiliary power supply of the universal quantum secure device controls to power on the main power supply, so as to make the main power supply supply power to the power control module. If the user controls the powered state of at least one module within the universal quantum secure device by operating a logic switch on a user interface displayed by a peripheral monitor connected to the universal quantum secure device, the power control module, upon receiving such operation, controls the operating state of the main power supply (including the main power supply of the privacy module 11, the main power supply of the communication module 13, and the like) corresponding to each of the at least one module within the universal quantum secure device, thereby realizing the control of the powered state of the at least one module within the universal quantum secure device.

In an example, because the quantum encryption and decryption module 12 is isolated from the communication module 13 and stores quantum secure data, the quantum encryption and decryption module 12 has a higher security level than other modules of the universal quantum secure device. Therefore, one or more of the following functions may also be realized by the quantum encryption and decryption module 12 of the universal quantum secure device: quantum digital signature, quantum secure data identity CA authentication, and quantum hash verification.

Figure 3:
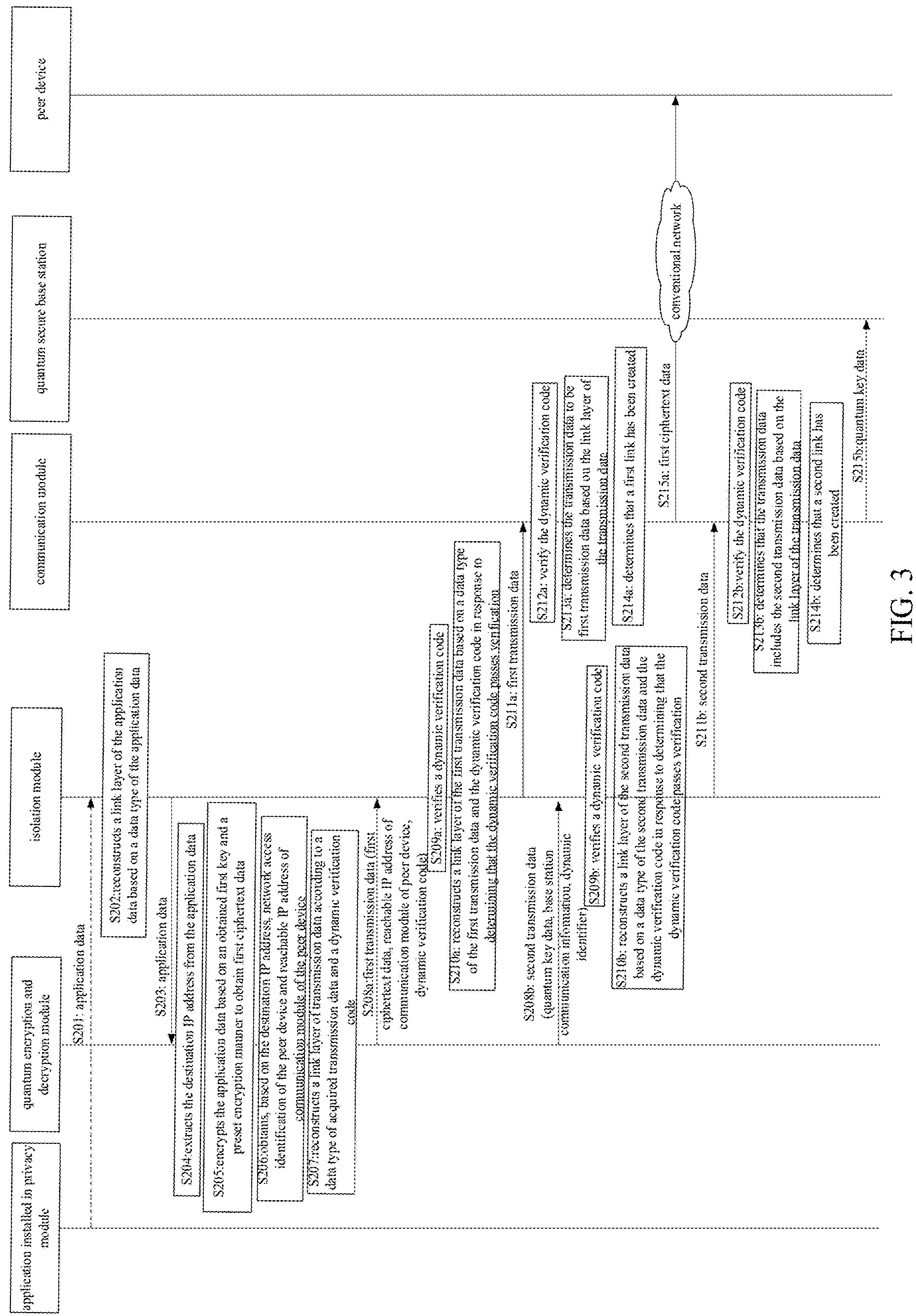
FIG. 3 shows a schematic diagram of workflow of sending data by the universal quantum secure device according to an embodiment of the present application.

A procedure of sending data by the universal quantum secure device provided in the present application is illustrated hereinafter by means of specific embodiments. FIG. 3 shows a schematic diagram of workflow of sending data by the universal quantum secure device according to an embodiment of the present application, which includes steps S201 to S215.

In S201, an application installed in the privacy module initiates application data and sends the application data to the isolation module.

The application data includes one or more of the following: transmitter port information, peer device port information, an IP address of the privacy module, a destination IP address, application layer data, and link layer information.

In an example, the application data further carries a second checksum corresponding to the application layer data.

In S202, after receiving the application data, the isolation module reconstructs a link layer of the application data based on a data type of the application data.

In an example, the isolation module may perform a security verification on the link layer of the application data, and reconstructs the link layer of the application data based on the data type of the application data in response to determining that the link layer of the application data passes the security verification. Specific processes of the isolation module performing the security verification on the link layer of the application data has been described in the above embodiments, and are not repeated herein.

In S203, the isolation module sends the application data to the quantum encryption and decryption module.

In S204, the quantum encryption and decryption module, after receiving the application data, extracts the destination IP address from the application data.

In S205, the quantum encryption and decryption module encrypts the application data based on an obtained first key and preset encryption manners to obtain first ciphertext data.

The preset encryption manners include a load encryption manner and a full encryption manner.

In an example, if the application data carries the second checksum, the quantum encryption and decryption module, after acquiring the first ciphertext data, may determine, based on a preset checksum algorithm, a first checksum corresponding to the application layer data in the first ciphertext data, and update, based on the first checksum, the second checksum carried by the first ciphertext data.

In S206, the quantum encryption and decryption module obtains, based on the destination IP address, a network access identification of the peer device and a reachable IP address of a communication module of the peer device.

In S207, the quantum encryption and decryption module reconstructs a link layer of transmission data according to a data type of acquired transmission data and a dynamic verification code.

The transmission data includes first transmission data and second transmission data, the first transmission data carries the reachable IP address of the communication module of the peer device and the first ciphertext data, the second transmission data carries quantum key data and base station communication information of a quantum secure base station accessed by the universal quantum secure device, and the quantum key data includes a key index of the first key and the network access identification.

In S208, the quantum encryption and decryption module sends the transmission data to the isolation module.

S208 includes S208*a* and S208*b*.

In S208*a*, the quantum encryption and decryption module sends the first transmission data to the isolation module.

In S208*b*, the quantum encryption and decryption module sends the second transmission data to the isolation module.

In S209, after receiving the transmission data sent by the quantum encryption and decryption module, the isolation module may verify a dynamic verification code carried by the transmission data.

S209 includes S209*a* and S209*b*.

In S209*a*, the isolation module verifies a dynamic verification code carried by the first transmission data.

In S209*b*, the isolation module verifies a dynamic verification code carried by the second transmission data.

In S210, the isolation module reconstructs the link layer of the transmission data based on the data type of the transmission data and the dynamic verification code in response to determining that the dynamic verification code passes verification.

In an example, if it is determined that the dynamic verification code fails verification, the isolation module discards the transmission data.

In an example, the isolation module may alternatively perform security verification on the transmission data in one or more other ways: data type verification, hash verification, and transmission format verification. In the case where the isolation module utilizes multiple ways to perform security verification on the transmission data, the data is required to pass security verification in each of the multiple ways before it can be transmitted. Specific processes of the isolation module performing security verification on the transmission data have been described in the above embodiments, and are not repeated herein.

S210 includes S210*a* and S210*b*.

In S210*a*, the isolation module reconstructs a link layer of the first transmission data based on a data type of the first transmission data and the dynamic verification code in response to determining that the dynamic verification code passes verification.

In S210*b*, the isolation module reconstructs a link layer of the second transmission data based on a data type of the second transmission data and the dynamic verification code in response to determining that the dynamic verification code passes verification.

In S211, the isolation module sends the transmission data to the communication module.

S211 includes S211*a* and S211*b*.

In S211*a*, the isolation module sends the first transmission data to the communication module.

In S211*b*, the isolation module sends the second transmission data to the communication module.

In S212, after receiving the transmission data sent by the isolation module, the communication module may verify the dynamic verification code carried by the transmission data.

S212 includes S212*a* and S212*b*.

In S212*a*, after receiving the first transmission data sent by the isolation module, the communication module may verify the dynamic verification code carried by the first transmission data.

In S212*b*, after receiving the second transmission data sent by the isolation module, the communication module may verify the dynamic verification code carried by the second transmission data.

In S213*a*, the communication module, in determining that the dynamic verification code passes verification, determines that the transmission data includes the first transmission data based on the link layer of the transmission data.

In S214*a*, the communication module determines that a first link has been created.

In an example, the communication module may determine, based on the reachable IP address of the communication module of the peer device, whether the first link to the reachable IP address of the communication module of the peer device has been created. If the first link to the reachable IP address of the communication module of the peer device has been created, the first ciphertext data is sent to the peer device through the first link; if no first link to the reachable IP address of the communication module of the peer device has been created, a first link to the reachable IP address of the communication module of the peer device is created first.

In S215*a*, the communication module sends the first ciphertext data to the peer device through the first link.

In S213*b*, the communication module, in determining that the dynamic verification code passes verification, determines that the transmission data includes the second transmission data based on the link layer of the transmission data.

In S214*b*, the communication module determines that a second link has been created.

If it is determined, based on the link layer of the transmission data, that the transmission data includes the second transmission data, it is indicated that the transmission data carries quantum key data, and it is necessary to send the quantum key data to the peer device through a quantum secure network, based on the base station communication information carried by the second transmission data, the quantum key data carried by the second transmission data is sent to a quantum secure base station in the quantum secure network, so that the quantum secure base station obtains the first key based on the key index carried in the quantum key data, and relays the first key to the peer device based on the network access identification carried in the quantum key data.

For example, the communication module may determine, based on the base station communication information, whether a second link to the base station communication information has been created. If the second link to the base station communication information has been created, the quantum key data is sent to the quantum secure base station via the second link; if no second link to the base station communication information has been created, a second link to the base station communication information is created first.

In S215*b*, the communication module sends the quantum key data to the peer device via the second link.

Figure 4:
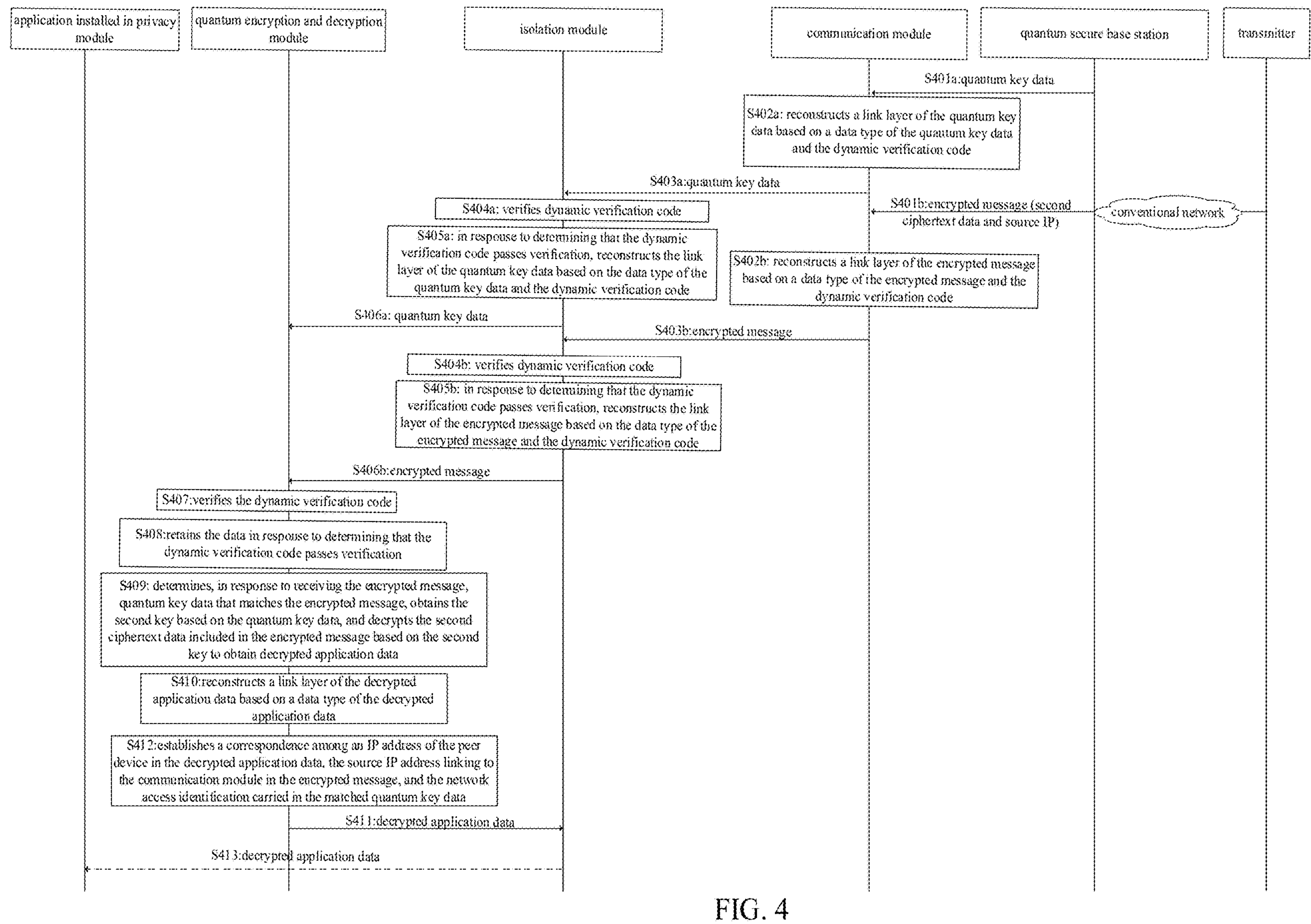
FIG. 4 shows a schematic diagram of a workflow of receiving data by the universal quantum secure device according to an embodiment of the present application.

A procedure of receiving data by the universal quantum secure device provided in the present application is illustrated hereinafter by means of specific embodiments. FIG. 4 shows a schematic diagram of a workflow of receiving data by the universal quantum secure device according to an embodiment of the present application, which includes steps S401 to S413.

In S401, the communication module receives data sent from an external network.

S401 includes S401*a* and S401*b*.

In S401*a*, the communication module receives quantum key data sent from the external network.

In S401*b*, the communication module receives an encrypted message sent from the external network.

The data may be an encrypted message or quantum key data. The encrypted message includes second ciphertext data and a source IP address which links to the communication module, and the quantum key data includes a second key and a network access identification of a transmitter.

In S402, the communication module obtains a dynamic verification code and reconstructs a link layer of the data based on a data type of the data and the dynamic verification code.

S402 includes S402*a* and S402*b*.

In S402*a*, the communication module obtains a dynamic verification code and reconstructs a link layer of the quantum key data based on a data type of the quantum key data and the dynamic verification code.

In S402*b*, the communication module obtains a dynamic verification code and reconstructs a link layer of the encrypted message based on a data type of the encrypted message and the dynamic verification code.

In S403, the communication module sends the data to the isolation module.

S403 includes S403*a* and S403*b*.

In S403*a*, the communication module sends the quantum key data to the isolation module.

In S403*b*, the communication module sends the encrypted message to the isolation module.

In S404, after receiving the data sent by the communication module, the isolation module verifies the dynamic verification code carried in the link layer of the data.

S404 includes S404*a* and S404*b*.

In S404*a*, the isolation module verifies the dynamic verification code carried in the link layer of the quantum key data.

In S404*b*, the isolation module verifies the dynamic verification code carried in the link layer of the encrypted message.

In S405, the isolation module, in the case of determining that the dynamic verification code passes verification, reconstructs the link layer of the data based on the data type of the data and the dynamic verification code.

S405 includes S405*a* and S405*b*.

In S405*a*, the isolation module, in the case of determining that the dynamic verification code passes verification, reconstructs the link layer of the quantum key data based on the data type of the quantum key data and the dynamic verification code.

In S405*b*, the isolation module, in the case of determining that the dynamic verification code passes verification, reconstructs the link layer of the encrypted message based on the data type of the encrypted message and the dynamic verification code.

In an example, if it is determined that the dynamic verification code fails verification, the isolation module discards the data.

In an example, the isolation module may alternatively perform security verification on the data in one or more other ways: data type verification, hash verification, and transmission format verification. In the case where the isolation module utilizes multiple ways to perform security verification on the data, the data is required to pass security verification in each of the multiple ways before it can be transmitted. Specific processes of the isolation module performing security verification on the data have been described in the above embodiments, and are not repeated herein.

In S406, the isolation module sends the data to the quantum encryption and decryption module.

S406 includes S406*a* and S406*b*.

In S406*a*, the isolation module sends the quantum key data to the quantum encryption and decryption module.

In S406*b*, the isolation module sends the encrypted message to the quantum encryption and decryption module.

In S407, after receiving the data, the quantum encryption and decryption module verifies the dynamic verification code carried in the link layer of the data.

In S408, the quantum encryption and decryption module, in the case of determining that the dynamic verification code passes verification, retains the data.

In an example, if it is determined that the dynamic verification code fails verification, the quantum encryption and decryption module discards the data.

In S409, the quantum encryption and decryption module determines, in response to receiving the encrypted message, quantum key data that matches the encrypted message, obtains the second key based on the quantum key data, and decrypts the second ciphertext data included in the encrypted message based on the second key to obtain decrypted application data.

In S410, the quantum encryption and decryption module reconstructs a link layer of the decrypted application data based on a data type of the decrypted application data.

In S411, the quantum encryption and decryption module sends the decrypted application data to the isolation module.

In S412, after obtaining the decrypted application data, the quantum encryption and decryption module establishes a correspondence among an IP address of the peer device in the decrypted application data, the source IP address linking to the communication module in the encrypted message, and the network access identification carried in the matched quantum key data.

It should be noted that the present application does not limit order of execution of S410~S411 and S412. S410~S411 may be executed before S412, or S412 may be executed before S410~S411.

In S413, after obtaining the decrypted application data sent by the quantum encryption and decryption module, the isolation module reconstructs the link layer of the decrypted application data based on the data type of the decrypted application data.

In an example, the isolation module may perform security verification on the link layer of the decrypted application data, and only in response to determining that the link layer of the decrypted application data passes the security verification, the isolation module reconstructs the link layer of the decrypted application data based on the data type of the decrypted application data. Specific processes of the isolation module performing the security verification on the link layer of the decrypted application data have been described in the above embodiments, and are not repeated herein.

In S414, the isolation module sends the decrypted application data to an application installed in the privacy module.

Based on the same inventive conception, a method of sending data is further provided in the present application, which is applied to the universal quantum secure device described in any one of the above embodiments. FIG. 5 shows a schematic flow chart of the method of sending data according to an embodiment of the present application, which includes steps S501 and S502.

In S501, the quantum encryption and decryption module receives, through the isolation module, application data initiated by an application installed in the privacy module, encrypts the application data based on an obtained first key to obtain first ciphertext data, and transmits the first ciphertext data and quantum key data corresponding to the first ciphertext data to the communication module through the isolation module respectively.

In S502, the communication module sends the first ciphertext data through a conventional network, and sends the quantum key data corresponding to the first ciphertext data through a quantum secure network.

It should be noted that the principle of the method provided in the embodiment for solving problems can be found in the above embodiments and will not be specifically described herein.

In some possible implementations, before the quantum encryption and decryption module encrypting the application data based on the obtained first key to obtain the first ciphertext data, the method further includes:

extracting a destination IP address from the application data; and obtaining a network access identification of a peer device and a reachable IP address of a communication module of the peer device based on the destination IP address.

The quantum encryption and decryption module transmitting the first ciphertext data and the quantum key data corresponding to the first ciphertext data to the communication module through the isolation module respectively includes:

sending acquired transmission data to the isolation module to send the transmission data to the communication module through the isolation module. The transmission data includes first transmission data and second transmission data. The first transmission data carries the reachable IP address of the communication module of the peer device and the first ciphertext data, the second transmission data carries the quantum key data corresponding to the first ciphertext data and base station communication information of a quantum secure base station accessed by the universal quantum secure device, and the quantum key data includes a key index of the first key and the network access identification.

The communication module sending the first ciphertext data through the conventional network, and sending the quantum key data corresponding to the first ciphertext data through the quantum secure network include:

in response to determining, based on a link layer of the transmission data, that the transmission data includes the first transmission data, sending the first ciphertext data carried by the first transmission data to the peer device based on the reachable IP address of the communication module of the peer device carried by the first transmission data;

in response to determining, based on the link layer of the transmission data, that the transmission data includes the second transmission data, sending the quantum key data carried by the second transmission data to the quantum secure base station based on the base station communication information carried by the second transmission data, to cause the quantum secure base station to obtain the first key based on the key index carried by the quantum key data and relay the first key to the peer device based on the network access identification carried by the quantum key data.

In some possible implementations, the method further includes:

in response to receiving data sent from the privacy module and determining that the data is not application-initiated application data based on a link layer of the data, discarding the data by the isolation module.

In some possible implementations, the quantum encryption and decryption module obtaining the first key includes:

obtaining the first key based on an encryption parameter corresponding to the application data, where the encryption parameter includes one or more of the following: an encryption strength, and a capacity of the application data.

In some possible implementations, the quantum encryption and decryption module encrypting the application data based on the obtained first key to obtain the first ciphertext data includes:

if a preset encryption manner is full encryption manner, encrypting data that does not belong to a link layer in the application data based on the first key and a first preset encryption algorithm to obtain the first ciphertext data; and/or if a preset encryption method is load encryption manner, encrypting application layer data in the application data based on the first key and a second preset encryption algorithm to obtain the first ciphertext data.

In some possible implementations, the quantum encryption and decryption module obtaining, based on the destination IP address, the network access identification of the peer device and the reachable IP address of the communication module of the peer device includes:

determining the network access identification of the peer device and the reachable IP address of the communication module of the peer device based on the destination IP address and a pre-saved correspondence among an IP address, the network access identification and the reachable IP address of the communication module of the peer device.

In some possible implementations, the network access identification corresponding to the IP address is obtained with at least one of the following manners:

obtaining, from a quantum secure domain name resolution device, the network access identification corresponding to the IP address; or obtaining, from a quantum secure application service device of the application, a network access identification respectively corresponding to an IP address of at least one quantum secure terminal using the application.

In some possible implementations, the isolation module sending the transmission data to the communication module includes:

determining, by the isolation module, that the transmission data passes a preset verification manner; where the verification manner includes one or more of the following: an encapsulation format of the transmission data being a pre-configured transmission format, the transmission data carrying a pre-agreed dynamic verification code, core data carried by the transmission data passing a hash verification, and a target data type of the transmission data satisfying a verification manner corresponding to the target data type.

In some possible implementations, before the communication module sending the transmission data to the peer device, the method further includes:

determining, by the communication module, that a dynamic verification code carried in the link layer of the transmission data passes verification.

In some possible implementations, before the communication module sending the transmission data to the peer device, the method further includes:

in response to determining, based on the link layer of the transmission data, that the transmission data does not satisfy a preset transmission requirement, discarding the transmission data and refraining from sending the transmission data to the peer device.

In some possible implementations, the communication module sending the first ciphertext data carried by the first transmission data to the peer device based on the reachable IP address of the communication module of the peer device carried by the first transmission data includes:

determining that a first link to the reachable IP address of the communication module of the peer device has been created, and sending the first ciphertext data to the peer device via the first link.

The communication module sending the quantum key data carried by the second transmission data to the quantum secure base station based on the base station communication information carried by the second transmission data includes:

determining that a second link to the base station communication information has been created, and sending the quantum key data to the quantum secure base station via the second link.

Beneficial effects of the method of sending data according to the embodiments of the present application are as follows.

1. With the isolation module, the privacy module can be isolated from the quantum encryption and decryption module. Hence, the application data is separated from the quantum security data, which avoids, to a certain extent, the application data from affecting the security of the quantum security data.

2. The quantum encryption and decryption module can realize encryption of data requiring quantum encryption service. Hence, data sent by the universal quantum secure device via the conventional network is ensured to be transmitted in form of ciphertext, ensuring safe transmission of the data across the conventional network and realizing active defense to a certain extent.

3. The communication module is a module of the universal quantum secure device, which can communicate with an external network. With the isolation module, the communication module can be isolated from both the quantum encryption and decryption module and the privacy module; in this way, the security of the privacy module and the security of the quantum encryption and decryption module of the universal quantum secure device can be protected from being affected by data received by the communication module from the external network.

4. The privacy module does not communicate with the external network; in addition, encryption of the data can only be carried out in the quantum encryption and decryption module of the universal quantum secure device. Hence, other devices in the external network are prevented from obtaining data before quantum encryption, improving data security.

Based on the same inventive conception, a method of receiving data is further provided in the present application, which is applied to the universal quantum secure device described in any one of the above embodiments. FIG. 6 shows a schematic flow chart of the method of receiving data according to an embodiment of the present application, which includes steps S601 and S602.

In S601, the quantum encryption and decryption module receives, via the isolation module, data received by the communication module from an external network, where the data includes an encrypted message or quantum key data, the encrypted message includes second ciphertext data, and the quantum key data includes a second key; in response to receiving the encrypted message, determines quantum key data that matches the encrypted message, obtains a second key based on the matched quantum key data, and decrypts the second ciphertext data included in the encrypted message based on the second key to obtain decrypted application data; and sends the decrypted application data to the isolation module.

In S602, the isolation module sends the decrypted application data to an application installed in the privacy module.

It should be noted that the principle of the method provided in the embodiment for solving problems can be found in the above embodiments and will not be specifically described herein.

In some possible implementations, for any encrypted message, after the quantum encryption and decryption module obtaining the decrypted application data corresponding to the encrypted message, the method further includes:

obtaining a transmitter IP address in the decrypted application data, a source IP address linking to the communication module included in the encrypted message, and a network access identification included in the quantum key data matching the encrypted message; and establishing a correspondence among the transmitter IP address, the source IP address and the network access identification.

In some possible implementations, after the isolation module receiving the data transmitted by the communication module and before the isolation module sending the data to the quantum encryption and decryption module, the method further includes:

determining, by the isolation module, that the data passes a preset verification manner; where the verification manner includes one or more of the following: an encapsulation format of the data being a pre-configured transmission format, the data carrying a pre-agreed dynamic verification code, core data carried by the data passing a hash verification, and a target data type of the data satisfying a verification manner corresponding to the target data type.

In some possible implementations, before the quantum encryption and decryption module, in response to receiving the encrypted message, determines quantum key data that matches the encrypted message, obtains the second key based on the matched quantum key data, and decrypts the second ciphertext data included in the encrypted message based on the second key to obtain the decrypted application data, the method further includes:

determining, by the quantum encryption and decryption module, that a dynamic verification code carried in a link layer of the data passes verification.

In some possible implementations, the quantum encryption and decryption module, in response to receiving the encrypted message, determining the quantum key data matching the encrypted message and obtaining the second key based on the matched quantum key data include:

obtaining a key sequence from the encrypted message according to pre-configured protocol specifications;

obtaining, from all cached quantum key data, target quantum key data carrying the key sequence; and obtaining the second key based on the target quantum key data.

In some possible embodiments, the method further includes:

in response to not obtaining, from all cached quantum key data, any target quantum key data carrying the key sequence, waiting until obtaining the target quantum key data.

In some possible implementations, the method further includes:

in response to receiving, by the isolation module, any decrypted application data addressed to the privacy module and determining, by the isolation module, that a link layer of the decrypted application data does not satisfy a preset transmission requirement, discarding the decrypted application data.

Beneficial effects of the method of receiving data according to the embodiments of the present application are as follows.

1. With the isolation module, the privacy module can be isolated from the quantum encryption and decryption module. Hence, the application data is separated from the quantum security data, which avoids, to a certain extent, the application data from affecting the security of the quantum security data.

2. The quantum encryption and decryption module can realize decryption of data requiring quantum decryption service. Hence, data received by the universal quantum secure device via the conventional network is ensured to be transmitted in form of ciphertext, ensuring safe transmission of the data across the conventional network and realizing active defense to a certain extent.

3. The communication module is a module of the universal quantum secure device, which can communicate with an external network. With the isolation module, the communication module can be isolated from both the quantum encryption and decryption module and the privacy module; in this way, the security of the privacy module and the security of the quantum encryption and decryption module of the universal quantum secure device can be protected from being affected by data received by the communication module from the external network.

4. The privacy module does not communicate with the external network; in addition, decryption of the data can only be carried out in the quantum encryption and decryption module of the universal quantum secure device. Hence, other devices in the external network are prevented from obtaining data before quantum encryption, improving data security.

On the basis of the above embodiments, a computer-readable storage medium is further provided according to an embodiment of the present application. The computer-readable storage medium has stored a computer program executable by a processor, and when the program is run on the processor, the processor is caused to perform the following steps:

the quantum encryption and decryption module receives, through the isolation module, application data initiated by an application installed in the privacy module, encrypts the application data based on an obtained first key to obtain first ciphertext data, and transmits the first ciphertext data and quantum key data corresponding to the first ciphertext data to the communication module respectively through the isolation module; and the communication module sends the first ciphertext data over a conventional network, and sends the quantum key data corresponding to the first ciphertext data over a quantum secure network.

The program, when run on the processor, further causes the processor to perform following steps:

the quantum encryption and decryption module receives, via the isolation module, data received by the communication module from an external network, where the data includes an encrypted message or quantum key data, the encrypted message includes second ciphertext data, the quantum key data includes a second key; in response to receiving the encrypted message, determines quantum key data that matches the encrypted message, obtains a second key based on the matched quantum key data, and decrypts the second ciphertext data included in the encrypted message based on the second key to obtain decrypted application data; and sends the decrypted application data to the isolation module; and the isolation module sends the decrypted application data to an application installed in the privacy module.

It should be noted that the principle of the computer-readable storage medium provided by the embodiments of the present application for solving problems is the same as the principle of the above embodiments directed to methods for solving problems, which is not repeated herein.

The various technical features of the above-described embodiments may be combined arbitrarily, and all possible combinations of the various technical features of the above-described embodiments have not been described for the sake of conciseness of description; however, as long as there is no contradiction in the combinations of these technical features, they should be considered to be within the scope of the present specification as recorded herein.

The above-described embodiments express only several embodiments of the present application, which are described in a more specific and detailed manner, but are not to be construed as a limitation of the scope of the patent application. It should be pointed out that, for a person of ordinary skill in the art, several deformations and improvements can be made without departing from the conception of the present application, all of which fall within the scope of protection of the present application. Therefore, the scope of protection of the patent application shall be subject to the attached claims.

What is claimed is:

1. A universal quantum secure device, comprising: an isolation module, a quantum encryption and decryption module, a communication module, and a privacy module, the isolation module being connected to each of the quantum encryption and decryption module, the communication module and the privacy module;

wherein the privacy module is configured to install an application and process application data of the application;

the isolation module is configured to transmit data between modules in the universal quantum secure device which are connected to the isolation module, the data comprising application data, ciphertext data, and quantum key data corresponding to the ciphertext data;

the quantum encryption and decryption module is configured to perform quantum encryption and decryption on data which is transmitted by the isolation module and requires quantum encryption and decryption services; and the communication module is configured to send and receive the ciphertext data over a conventional network, and send and receive the quantum key data corresponding to the ciphertext data over a quantum secure network.

2. The universal quantum secure device of claim 1, wherein the ciphertext data comprises first ciphertext data and second ciphertext data, and the quantum encryption and decryption module is configured to:

obtain a first key for encrypting data requiring quantum encryption service, and encrypt the data requiring quantum encryption service based on the first key to obtain the first ciphertext data; and receive data requiring quantum decryption service transmitted by the isolation module, and decrypt second ciphertext data comprised in the data requiring quantum decryption service based on quantum key data corresponding to the received data requiring quantum decryption service to obtain decrypted application data.

3. The universal quantum secure device of claim 2, wherein the quantum encryption and decryption module is further configured to, before encrypting the data requiring quantum encryption service based on the first key to obtain the first ciphertext data, obtain a destination IP address carried in the data requiring quantum encryption service and obtain, based on the destination IP address, a network access identification and a reachable IP address of a communication module of a peer device which correspond to the destination IP address; and the quantum encryption and decryption module is configured to, after obtaining the first ciphertext data, transmit first transmission data carrying the first ciphertext data and the reachable IP address of the communication module of the peer device to the communication module through the isolation module and transmit second transmission data carrying base station communication information and quantum key data corresponding to the first ciphertext data to the communication module through the isolation module, to cause the communication module to send the first ciphertext data to the peer device based on the reachable IP address of the communication module of the peer device carried in the first transmission data and to send the quantum key data to a quantum secure base station accessed by the universal quantum secure device based on the base station communication information so as to send the quantum key data to the peer device via the quantum secure base station; wherein the quantum key data comprises the network access identification and a key index of the first key.

4. The universal quantum secure device of claim 3, wherein the communication module is configured to:

determine that a first link to the reachable IP address of the communication module of the peer device has been created, and send the first ciphertext data to the peer device through the first link; and determine that a second link to the base station communication information has been created, and send the quantum key data to the quantum secure base station through the second link.

5. The universal quantum secure device of claim 2, wherein the quantum encryption and decryption module is configured to: obtain a key sequence from the data requiring quantum decryption service according to pre-configured protocol specifications, obtain target quantum key data carrying the key sequence from all cached quantum key data, and obtain a second key based on the target quantum key data.

6. The universal quantum secure device of claim 1, wherein the isolation module is configured to: determine a verification manner corresponding to the data based on a transmission path of the data, and perform security verification on the data with the verification manner.

7. The universal quantum secure device of claim 6, wherein the isolation module is configured to:

determine whether a link layer of the data satisfies a preset transmission requirement in the case that the transmission path of the data is a transmission path between the privacy module and the quantum encryption and decryption module;

in response to determining that the link layer of the data satisfies the preset transmission requirement, determining that the data passes the security verification; and in response to determining that the link layer of the data does not satisfy the preset transmission requirement, determining that the data fails the security verification.

8. The universal quantum secure device of claim 7, wherein the isolation module is configured to, in the case that the transmission path of the data is a transmission path between the quantum encryption and decryption module and the communication module, determine the verification manner corresponding to the data to comprise one or more of the following:

an encapsulation format of the data being a pre-configured transmission format;

the data carrying a pre-agreed dynamic verification code;

core data carried by the data passing a hash verification; and a target data type of the data satisfying a verification manner corresponding to the target data type.

9. The universal quantum secure device of claim 1, further comprising:

receiving, by the quantum encryption and the decryption module via the isolation module, the data received by the communication module from an external network, wherein the data comprises an encrypted message or quantum key data, the encrypted message comprises second ciphertext data, and the quantum key data comprises a second key;

for the received encrypted message, determining quantum key data that matches the encrypted message, obtaining a second key based on the matched quantum key data, and decrypting the second ciphertext data comprised in the encrypted message based on the second key to obtain decrypted application data; and sending the decrypted application data to the isolation module; and sending, by the isolation module, the decrypted application data to an application installed in the privacy module.

10. The universal quantum secure device of claim 9, wherein after the isolation module receiving the data transmitted by the communication module and before the isolation module sending the data to the quantum encryption and decryption module, further comprises:

determining, by the isolation module, that the data passes a preset verification manner; wherein the verification manner comprises one or more of the following:

an encapsulation format of the data being a pre-configured transmission format, the data carrying a pre-agreed dynamic verification code, core data carried by the data passing a hash verification, and a target data type of the data satisfying a verification manner corresponding to the target data type.

11. The universal quantum secure device of claim 9, wherein the quantum encryption and decryption module, in response to receiving the encrypted message, determining the quantum key data matching the encrypted message and obtaining the second key based on the matched quantum key data comprise:

obtaining a key sequence from the encrypted message according to pre-configured protocol specifications;

obtaining, from all cached quantum key data, target quantum key data carrying the key sequence; and obtaining the second key based on the target quantum key data.

12. The universal quantum secure device of claim 9, further comprising:

in response to receiving, by the isolation module, any decrypted application data addressed to the privacy module and determining, by the isolation module, that a link layer of the decrypted application data does not satisfy a preset transmission requirement, discarding the decrypted application data.

13. A method of sending data, applied to a universal quantum secure device, the method comprising:

receiving, by a quantum encryption and decryption module via an isolation module, application data initiated by an application installed in a privacy module; encrypting, by the quantum encryption and decryption module, the application data based on an obtained first key to obtain first ciphertext data; and transmitting, by the quantum encryption and decryption module, the first ciphertext data and quantum key data corresponding to the first ciphertext data to a communication module via the isolation module respectively; and sending, by the communication module, the first ciphertext data over a conventional network, and sending, by the communication module, the quantum key data corresponding to the first ciphertext data over a quantum secure network.

14. The method of claim 13, wherein before the quantum encryption and decryption module encrypting the application data based on the obtained first key to obtain the first ciphertext data, further comprising:

extracting a destination IP address from the application data; and obtaining a network access identification of a peer device and a reachable IP address of a communication module of the peer device based on the destination IP address;

wherein the quantum encryption and decryption module transmitting the first ciphertext data and the quantum key data corresponding to the first ciphertext data to the communication module via the isolation module respectively comprises:

sending acquired transmission data to the isolation module to send the transmission data to the communication module via the isolation module, wherein the transmission data comprises first transmission data and second transmission data, the first transmission data carries the reachable IP address of the communication module of the peer device and the first ciphertext data, the second transmission data carries the quantum key data corresponding to the first ciphertext data and base station communication information of a quantum secure base station accessed by the universal quantum secure device, and the quantum key data includes a key index of the first key and the network access identification;

wherein the communication module sending the first ciphertext data over the conventional network, and sending the quantum key data corresponding to the first ciphertext data over the quantum secure network comprise:

in response to determining, based on a link layer of the transmission data, that the transmission data comprises the first transmission data, sending the first ciphertext data carried by the first transmission data to the peer device based on the reachable IP address of the communication module of the peer device carried by the first transmission data; and in response to determining, based on the link layer of the transmission data, that the transmission data comprises the second transmission data, sending the quantum key data carried by the second transmission data to the quantum secure base station based on the base station communication information carried by the second transmission data, to cause the quantum secure base station to obtain the first key based on the key index carried by the quantum key data and relay the first key to the peer device based on the network access identification carried by the quantum key data.

15. The method of claim 13, further comprising:

in response to receiving data sent from the privacy module and determining that the data is not application-initiated application data based on a link layer of the data, discarding the data by the isolation module.

16. The method of claim 15, wherein the quantum encryption and decryption module obtaining, based on the destination IP address, the network access identification of the peer device and the reachable IP address of the communication module of the peer device comprises:

determining the network access identification of the peer device and the reachable IP address of the communication module of the peer device based on the destination IP address and a pre-saved correspondence among an IP address, the network access identification and the reachable IP address of the communication module of the peer device.

17. The method of claim 16, wherein the network access identification corresponding to the IP address is obtained with at least one of the following manners:

obtaining, from a quantum secure domain name resolution device, the network access identification corresponding to the IP address; or obtaining, from a quantum secure application service device of the application, a network access identification respectively corresponding to an IP address of at least one quantum secure terminal using the application.

18. The method of claim 14, wherein the isolation module sending the transmission data to the communication module comprises:

determining, by the isolation module, that the transmission data passes a preset verification manner; wherein the verification manner comprises one or more of the following: an encapsulation format of the transmission data being a pre-configured transmission format, the transmission data carrying a pre-agreed dynamic verification code, core data carried by the transmission data passing a hash verification, and a target data type of the transmission data satisfying a verification manner corresponding to the target data type.

19. The method of claim 14, wherein the communication module sending the first ciphertext data carried by the first transmission data to the peer device based on the reachable IP address of the communication module of the peer device carried by the first transmission data comprises:

determining that a first link to the reachable IP address of the communication module of the peer device has been created, and sending the first ciphertext data to the peer device via the first link;

wherein the communication module sending the quantum key data carried by the second transmission data to the quantum secure base station based on the base station communication information carried by the second transmission data comprises:

determining that a second link to the base station communication information has been created, and sending the quantum key data to the quantum secure base station via the second link.

* * * * *